US009848076B2

(12) United States Patent
Park

(10) Patent No.: US 9,848,076 B2
(45) Date of Patent: Dec. 19, 2017

(54) ELECTRONIC DEVICE AND METHOD FOR CONTROLLING NOTIFICATION IN ELECTRONIC DEVICE

(71) Applicant: Samsung Electronics Co., Ltd., Gyeonggi-do (KR)

(72) Inventor: Sung-Hyun Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/866,074

(22) Filed: Sep. 25, 2015

(65) Prior Publication Data

US 2016/0095083 A1    Mar. 31, 2016

(30) Foreign Application Priority Data

Sep. 26, 2014  (KR) .................. 10-2014-0129397

(51) Int. Cl.
*H04W 68/00* (2009.01)
*H04M 1/725* (2006.01)

(52) U.S. Cl.
CPC ... *H04M 1/72597* (2013.01); *H04M 1/72522* (2013.01); *H04W 68/00* (2013.01); *H04M 1/72544* (2013.01); *H04M 1/72558* (2013.01)

(58) Field of Classification Search
CPC ......... H04M 1/72597; H04M 1/72522; H04M 1/72544; H04M 1/72558; H04W 68/00
USPC ................... 455/458, 414.1; 345/156; 725/37
See application file for complete search history.

(56) References Cited

U.S. PATENT DOCUMENTS

| | | | | |
|---|---|---|---|---|
| 6,193,422 B1* | 2/2001 | Belt | .................. | G06F 1/24 710/18 |
| 7,243,130 B2* | 7/2007 | Horvitz | .............. | G05B 19/404 709/206 |
| 7,287,056 B2* | 10/2007 | Loveland | ............. | H04Q 3/0062 379/211.01 |
| 8,615,221 B1* | 12/2013 | Cosenza | ................. | H04M 3/42 455/414.1 |
| 9,037,455 B1* | 5/2015 | Faaborg | .................. | G10L 21/00 704/208 |
| 2002/0057285 A1* | 5/2002 | Nicholas, III | ...... | G06F 3/04812 715/700 |
| 2002/0078447 A1* | 6/2002 | Mizutome | ........... | H04N 5/4401 725/37 |
| 2005/0075166 A1* | 4/2005 | Hemstreet | .............. | G11B 27/02 463/30 |
| 2006/0223547 A1* | 10/2006 | Chin | ..................... | G06F 1/3287 455/456.1 |
| 2007/0086365 A1* | 4/2007 | Chen | ................... | H04L 12/1822 370/260 |
| 2007/0243893 A1* | 10/2007 | Takahashi | .............. | H04W 4/10 455/518 |

(Continued)

FOREIGN PATENT DOCUMENTS

KR    10-0619859    9/2006
KR    10-2008-0083498    9/2008

*Primary Examiner* — Mong-Thuy Tran
(74) *Attorney, Agent, or Firm* — The Farrell Law Firm, P.C.

(57) ABSTRACT

An electronic device and a method controlling a notification are provided. The method includes determining an execution state of an application that is currently executed when an interruption occurs while the application is executed, and controlling whether to output a notification associated with the interruption based on the execution state of the application.

23 Claims, 32 Drawing Sheets

(56) References Cited

U.S. PATENT DOCUMENTS

| | | | | |
|---|---|---|---|---|
| 2008/0045276 A1* | 2/2008 | Kuwabara | G06F 9/4825 | 455/572 |
| 2011/0169632 A1* | 7/2011 | Walker | H03G 3/32 | 340/539.13 |
| 2011/0207481 A1* | 8/2011 | Yin | H04W 36/0022 | 455/458 |
| 2012/0009906 A1* | 1/2012 | Patterson | H04M 1/72519 | 455/414.1 |
| 2012/0236037 A1* | 9/2012 | Lessing | G06F 3/017 | 345/661 |
| 2012/0295661 A1* | 11/2012 | Kim | G06F 3/017 | 455/556.1 |
| 2012/0304242 A1* | 11/2012 | Morikawa | H04N 21/4345 | 725/131 |
| 2013/0076672 A1* | 3/2013 | Sirpal | G06F 3/1438 | 345/173 |
| 2013/0111091 A1* | 5/2013 | Chun | G06F 9/4443 | 710/266 |
| 2013/0145303 A1* | 6/2013 | Prakash | G06F 3/04883 | 715/779 |
| 2013/0332721 A1 | 12/2013 | Chaudhri et al. | | |
| 2014/0173667 A1* | 6/2014 | Koizumi | H04N 21/4314 | 725/62 |
| 2014/0306887 A1* | 10/2014 | Mukai | G06F 3/048 | 345/156 |
| 2015/0194165 A1* | 7/2015 | Faaborg | G10L 21/00 | 704/270.1 |
| 2015/0207926 A1* | 7/2015 | Brown | H04M 1/72597 | 455/414.1 |

\* cited by examiner

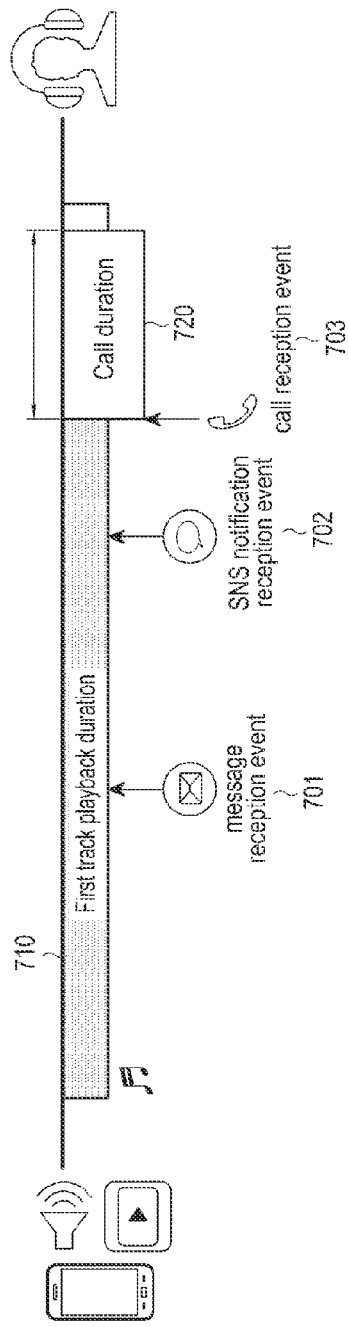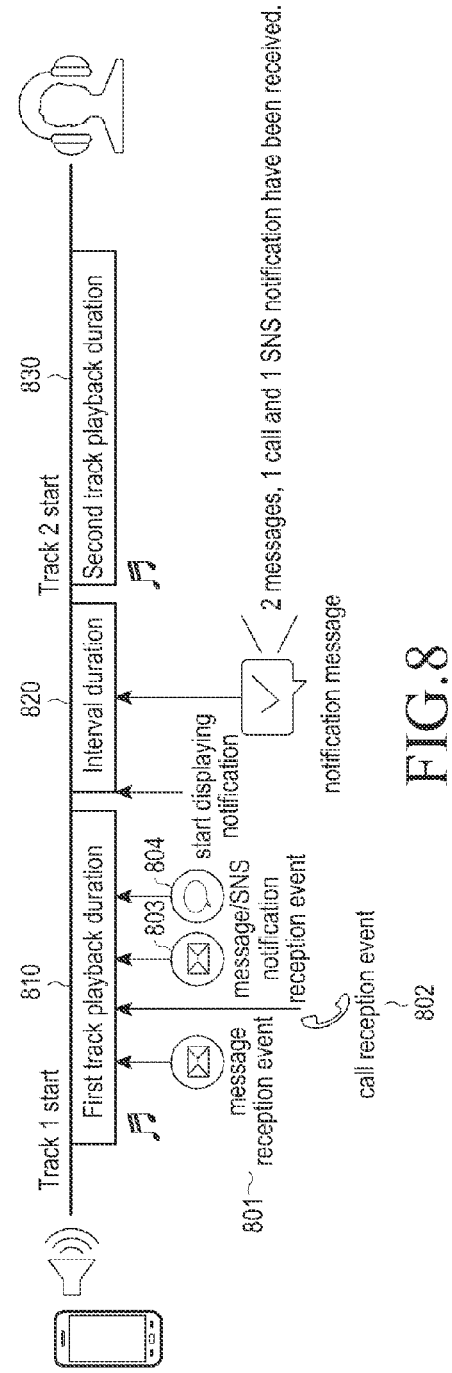
FIG.7
FIG.8

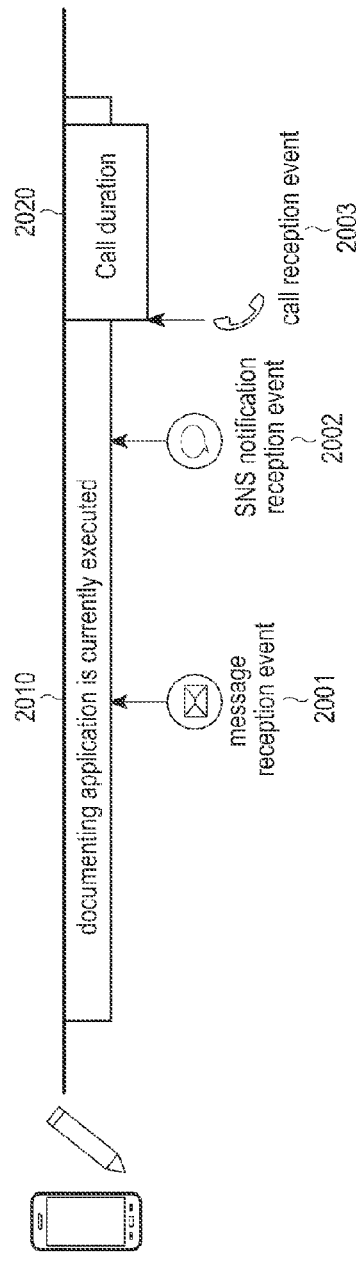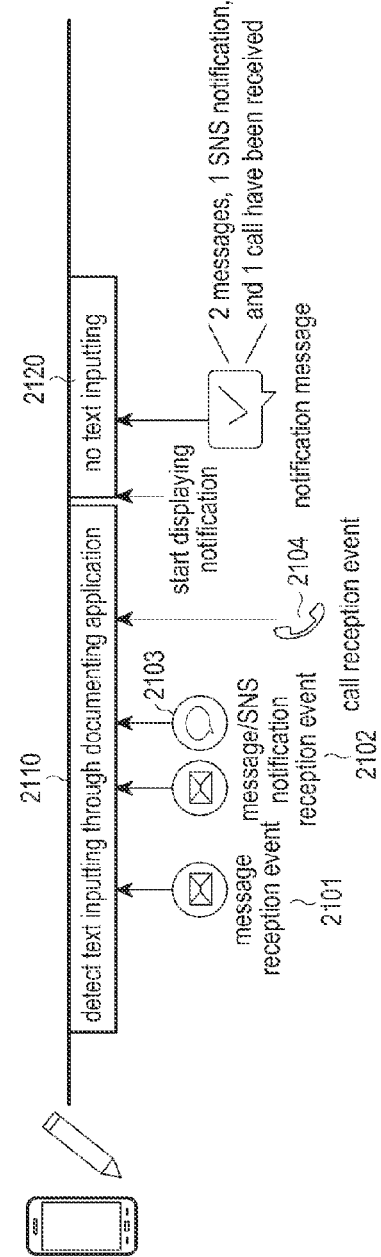

ELECTRONIC DEVICE AND METHOD FOR CONTROLLING NOTIFICATION IN ELECTRONIC DEVICE

PRIORITY

This application claims priority under 35 U.S.C. §119(a) to Korean Patent Application Serial No. 10-2014-0129397, which was filed in the Korean Intellectual Property Office on Sep. 26, 2014, the entire content of which is incorporated herein by reference.

BACKGROUND

1. Field of Invention

The present invention relates generally to an electronic device and a method for an electronic device for controlling a notification.

2. Description of Related Art

Electronic devices that are commonly used have been developed to include various functions. The electronic device may provide a display unit for the effective use of various functions. For example, a display unit that responds to a touch (e.g., a touch screen) may be provided on the front surface of the electronic device.

In addition, various types of applications (also referred to as 'apps') may be installed and executed in the electronic device. Various input means (for example, a touch screen, buttons, a mouse, a keyboard, a sensor or the like) may be used to execute and control the applications in the electronic device.

One of the functions that is commonly used through the electronic device is watching media contents. A user may watch media contents by playing back a media content stored in the electronic device, or through a streaming service.

In an electronic device, at least one interruption (for example, call reception) may occur while an application (for example, a media playback application) is executed. The electronic device interrupts the application that is currently executed, and outputs a notification associated with the interruption. A user may be inconvenienced by using applications when an application that is currently executed is interrupted or disturbed. Accordingly, there is a need for controlling a notification of an electronic device.

SUMMARY

The present invention has been made to address at least the problems and disadvantages described above, and to provide at least the advantages described below.

Accordingly, an aspect of the present invention is control a notification in an electronic device, by determining whether to output a notification associated with an interruption that occurs while an application is executed, a point in time for notification, a notification method, or the like, based on a type or an execution state of the application.

Accordingly, another aspect of the present invention is to disregard or delay outputting a notification association with an interruption based on an execution state of an application that is currently executed, and thus, a user may operate the application without disturbance when an interruption occurs.

In accordance with an aspect of the present invention, an electronic device is provided. The electronic device includes a processor to determine an execution state of an application that is currently executed when an interruption occurs while the application is executed, and to control whether to output a notification associated with the interruption based on the execution state of the application, and a display to display the notification associated with the interruption.

In accordance with another aspect of the present invention, a method of controlling a notification in an electronic device is provided. The method includes determining an execution state of an application that is currently executed when an interruption occurs while the application is executed, and controlling whether to output a notification associated with the interruption based on the execution state of the application.

BRIEF DESCRIPTION OF THE DRAWINGS

The above and other aspects, features, and advantages of the present invention will be more apparent from the following detailed description taken in conjunction with the accompanying drawings, in which:

FIG. 7 is a timing diagram indicating a point in time for outputting a notification received while a media application is executed and a media-concentrated mode is deactivated, according to an embodiment of the present invention;

FIG. 8 is a timing diagram indicating a point in time for outputting a notification received while a media application is executed and a media-concentrated mode is activated, according to an embodiment of the present invention;

FIG. 20 is a timing diagram indicating a point in time for outputting a notification received while a document editing application is executed and a media-concentrated mode is deactivated, according to an embodiment of the present invention;

FIG. 21 is a timing diagram indicating a point in time for outputting a notification received while a document editing application is executed and a media-concentrated mode is activated, according to an embodiment of the present invention;

DETAILED DESCRIPTION OF EMBODIMENTS OF THE PRESENT INVENTION

Figure 1:
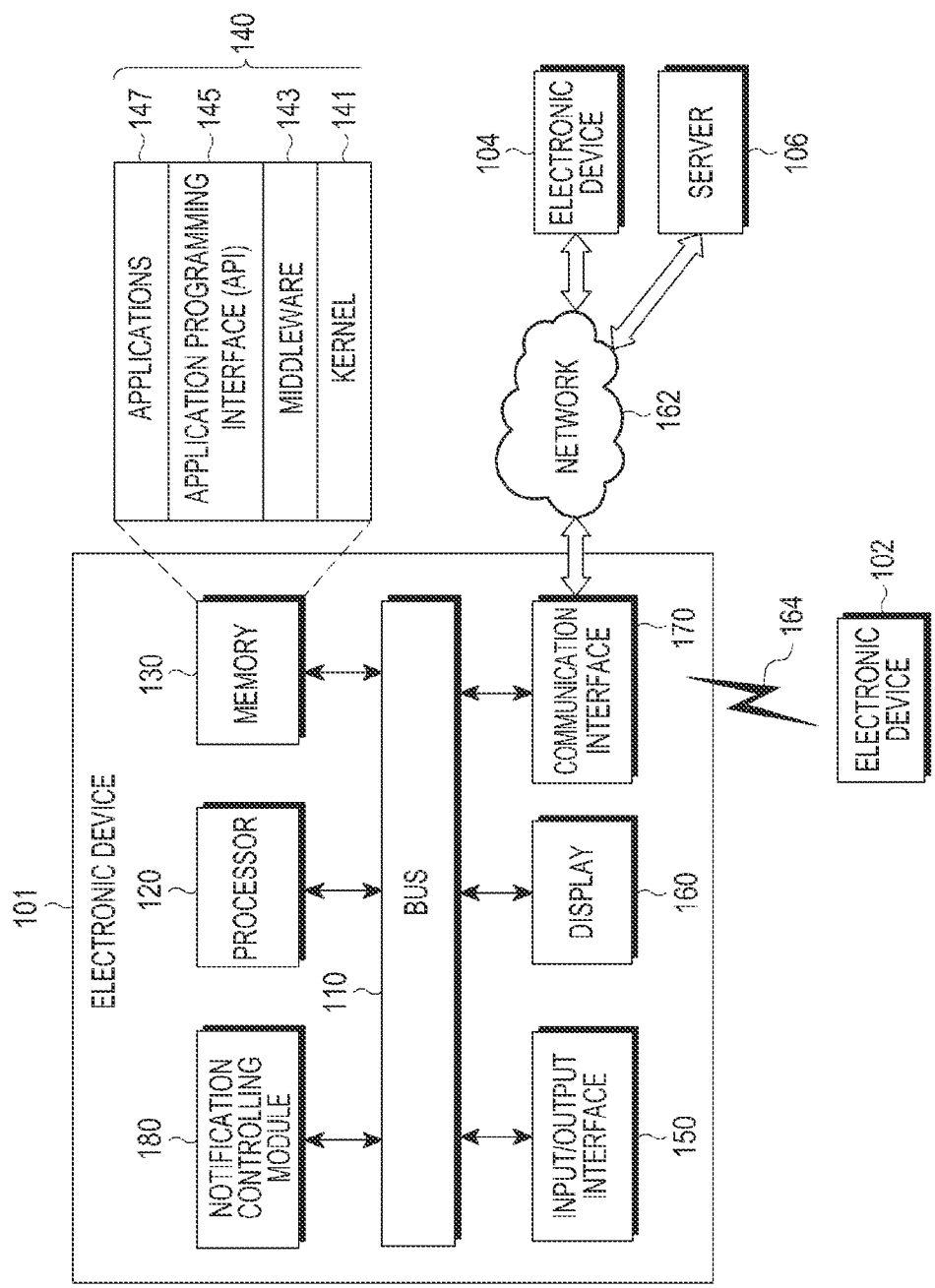
FIG. 1 is a block diagram of a network environment, according to an embodiment of the present invention.

Hereinafter, various embodiments of the present invention will be described with reference to the accompanying drawings. However, it should be understood that there is no intent to limit the present invention to the particular forms disclosed herein; rather, the present invention should be construed to cover various modifications, equivalents, and/or alternatives of embodiments of the present invention. In describing the drawings, similar reference numerals may be used to designate similar constituent elements.

As used herein, the expressions "have", "may have", "include" and "may include" refer to the existence of a corresponding feature (e.g., numerical value, function, operation, or components such as elements), and do not exclude the existence of additional features.

As used herein, the expressions "A or B", "at least one of A or/and B", and "one or more of A or/and B" may include all possible combinations of the items listed. For example, the expression "A or B", "at least one of A and B", or "at least one of A or B" refers to all of (1) including A, (2) including B, or (3) including A and B.

The expressions "a first", "a second", "the first", or "the second", used in herein, may modify various components regardless of the order and/or the importance, but does not limit the corresponding components. The above expressions are used merely for the purpose of distinguishing an element from the other elements. For example, a first user device and a second user device indicate different user devices although both of them are user devices. For example, a first element may be referred to as a second element, and similarly, a second element may be referred to as a first element without departing from the scope of the present invention.

It should be understood that when an element (e.g., a first element) is referred to as being (operatively or communicatively) "connected," or "coupled," to another element (e.g., a second element), it may be directly connected or coupled directly to the other element or any other element (e.g., a third element) may be interposed between them. In contrast, it should be understood that when an element (e.g., a first element) is referred to as being "directly connected,"

or "directly coupled" to another element (e.g., a second element), there are no element (e.g., third element) interposed between them.

The expression "configured to" used herein may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present invention. As used herein, singular forms may include plural forms as well unless the context clearly indicates otherwise. Unless defined otherwise, all terms used herein, including technical and scientific terms, have the same meaning as those commonly understood by a person skilled in the art to which the present invention pertains. Such terms as those defined in a generally used dictionary are to be interpreted to have meanings consistent with the contextual meanings in the relevant field of the art, and are not to be interpreted to have ideal or excessively formal meanings unless clearly defined in the present disclosure. In some cases, even a term defined in the present disclosure should not be interpreted to exclude embodiments of the present invention.

The electronic device may include at least one of a smartphone a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted Device (HMD), such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Versatile Disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (DR), a Flight Data Recorder (FDR), a Vehicle Infotainment Devices, an electronic device for a ship (e.g., a navigation device for a ship, and a gyro-compass), avionics, security devices, an automotive head unit, a robot for home or industry, an Automatic Teller Machine (ATM), Point of Sale (POS) machine, or Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present invention may be a combination of one or more of the aforementioned various electronic devices. The electronic device according to some embodiments of the present invention may be a flexible device. Further, the electronic device according to an embodiment of the present invention is not limited to the aforementioned electronic devices, and may include a new electronic device according to the development of future technology.

Hereinafter, an electronic device according to various embodiments of the present invention will be described with reference to the accompanying drawings. As used herein, the term "user" may refer to a person who uses an electronic device or may refer to a device (e.g., an artificial intelligence electronic device) that uses an electronic device.

FIG. 1 is a block diagram of a network environment, according to an embodiment of the present invention.

Referring to FIG. 1, an electronic device 101 is provided in a network environment.

The electronic device 101 may include a bus 110, a processor 120, a memory 130, an input/output interface 150, a display 160, a communication interface 170, and a notification controlling module 180. According to an embodiment of the present invention, at least one of the components of the electronic device 101 may be omitted, or other components may be additionally included in the electronic device 101.

The bus 110 may include a circuit for connecting the components of the electronic device 101 (i.e., the processor 120, the memory 130, the input/output interface 150, the display 160, the communication interface 170, and the notification controlling module 180) and transmitting communication between the components (for example, control messages and/or data).

The processor 120 may include one or more of a Central Processing Unit (CPU), an Application Processor (AP), and a Communication Processor (CP). The processor 120 may control one or more other components of the electronic device 101 and/or processes an operation or data related to communication.

The memory 130 includes a volatile memory and/or a non-volatile memory. The memory 130 may store, for example, instructions or data related to at least one other component of the electronic device 101. The memory 130 may store software and/or a program 140. The program 140 may include a kernel 141, middleware 143, an Application Programming Interface (API) 145, and/or an application programs (or applications) 147. At least some of the kernel 141, the middle 143, and the API 145 may be referred to as an Operating System (OS).

The kernel 141 may control or manage system resources (for example, the bus 110, the processor 120, or the memory 130) used for executing an operation or function implemented in other programs 140 (for example, the middleware 143, the API 145, or the applications 147). Furthermore, the kernel 141 may provide an interface through which the middleware 143, the API 145, or the applications 147 may access individual components of the electronic device 101 to control or manage system resources.

The middleware 143 may serve as an intermediary such that the API 145 or the application program 147 communicates with the kernel 141 to transmit/receive data. Furthermore, in regard to task requests received from the applications 147, the middleware 143 may perform a control (for example, scheduling or load balancing) for the task requests using a method of assigning at least one of the applications 147 a priority for using the system resources (for example, the bus 110, the processor 120, or the memory 130) of the electronic device 101.

The API 145 is an interface by which the applications 147 control functions provided from the kernel 141 or the middleware 143, and may include at least one interface or function (for example, instructions) for file control, window control, image processing, or text control.

The input/output interface 150 may serve as an interface that may transfer instructions or data, which is input from a user or another external device, to another component(s) of the electronic device 101. Further, the input/output interface 150 may output instructions or data received from another component(s) of the electronic device 101 to a user or an external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display.

The display 160 may display various types of contents (for example, text, images, videos, icons, or symbols) to users. The display 160 may include a touch screen, and in this case, may receive, for example, a touch gesture, a proximity gesture, or a hovering input using an electronic pen or a user's body part.

The communication interface 170 may set communication between the electronic device 101 and a first external electronic device 102, a second external electronic device 104, or a server 106. For example, the communication interface 170 may be connected to a network 162 through wireless or wired communication to communicate with the second external electronic device 104 or the server 106. The communication interface 170 may be connected to the first external electronic device 102 through short range communication 164 or wired communication.

The wireless communication may use, for example, at least one of Long Term Evolution (LTE), LTE-Advanced (LTE-A), Code Division Multiple Access (CDMA), Wideband CDMA (WCDMA), Universal Mobile Telecommunication System (UMTS), Wireless Broadband (WiBro), and Global System for Mobile communication (GSM), as a cellular communication protocol. The wired communication may include at least one of, for example, a Universal Serial Bus (USB), a High Definition Multimedia Interface (HDMI), Recommended Standard 3632 (RS-232), and a Plain Old Telephone Service (POTS). Wireless communication may also include short-wireless communication 164. Short-wireless communication 164 may include at least one of WiFi, Bluetooth (BT), near field communication (NFC), magnetic secure transmission (MST), and global navigation satellite system (GNSS). The GNSS may include at least one of global positioning system (GPS), global navigation satellite system (Glonass), Beidou navigation satellite system (Beidou), and Galileo, the European global satellite-based navigation system. In the present disclosure. "GPS" and "GNSS" may be used interchangeably.

The network 162 may include at least one of communication networks such as a computer network (for example, a LAN or a WAN), the Internet, and a telephone network.

The notification controlling module 180 may control a notification associated with an interruption (for example, a point in time for notification or a notification method) when an interruption occurs while an application is executed in the electronic device 101. For example, the notification controlling module 180 may determine whether to output a notification associated with an interruption based on an execution state of an application.

A part of the configuration of the notification controlling, module 180 may be operated by being included in the processor 120 or the communication interface 170. Additional descriptions of the notification controlling module 180 will be provided with respect to FIG. 2.

Each of the first and second external electronic devices 102 and 104 may be a device which is the same as or different from the electronic device 101. The server 106 may include a group of one or more servers.

According to various embodiments of the present invention, all or some of the operations performed by the electronic device 101 may be performed by another electronic device or a plurality of electronic devices, such as the first external electronic device 102, the second external electronic device 104, or the server 106. When the electronic device 101 performs some functions or services automatically or by request, the electronic device 101 may request the first external electronic device 102, the second external electronic device 104, or the server 106 to perform at least some of the functions related to the functions or services, in addition to or instead of performing the functions or services by itself. In this case, the first external electronic device 102, the second external electronic device 104, or the server 106 may carry out the requested function or the additional function, and transfers the result to the electronic device 101. The electronic device 101 may provide the requested functions or services based on the received result as is or after additionally processing the received result. To this end, for example, cloud computing, distributed computing, or client-server computing technology may be used.

Figure 2:
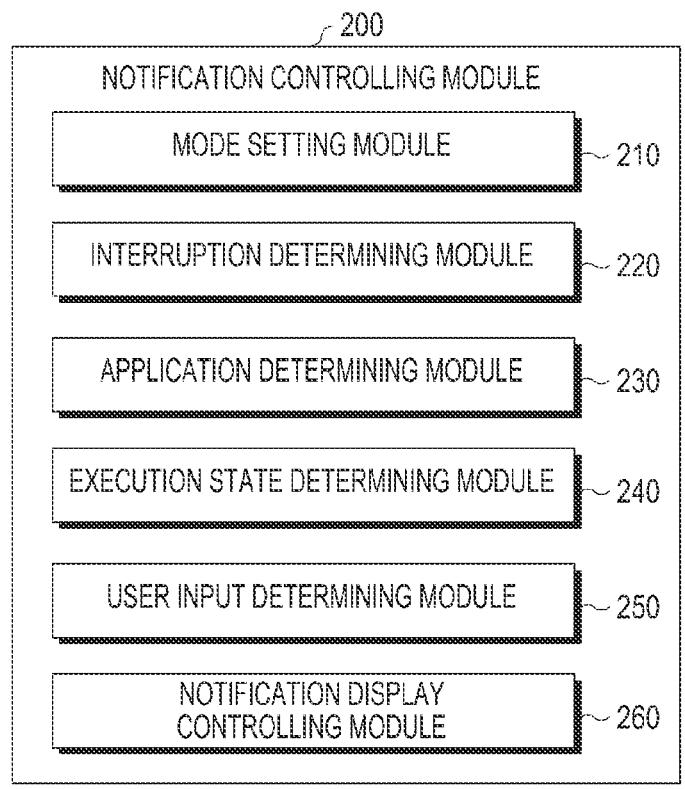
FIG. 2 is a block diagram of a configuration of a notification controlling module of an electronic device, according to an embodiment of the present invention.

FIG. 2 is a block diagram of a configuration of a notification controlling module of an electronic device, according to an embodiment of the present invention.

Referring to FIG. 2, a notification controlling module 200 may include at least one of a mode setting module 210, an interruption determining module 220, an application determining module 230, an execution state determining module 240, a user input determining module 250, and a notification display controlling module 260.

The mode setting module 210 may control settings associated with a media-concentrated mode in the electronic device 101. For example, when a media-concentrated mode is activated, whether to output a notification associated with an interruption is determined based on an execution state of an application of the applications 147.

The media-concentrated mode may be set by being included in a menu of a predetermined application, may be set by a user input by being displayed on a waiting screen of the electronic device 101, or may be set for a predetermined application in advance by the electronic device 101.

The interruption determining module 220 may determine an interruption that occurs while an application is executed in the electronic device 101. The interruption may include at least one of a call reception event, a message reception event, and a Social Networking Service (SNS) notification reception event, which occurs while an application is executed.

Although the call reception event, the message reception event, or the SNS notification reception event is described as an example of an interruption, any operation that disturbs the execution of an application may be an interruption.

The application determining module 230 may determine a type of an application that is currently executed in the electronic device 101. For example, the type of application may be at least one of a media playback application (for example, a music or video playback application), a recording application (for example, a voice recording or camera application), a document editing application (for example, a memo application), an electronic book (e-book) application, a healthcare application (for example, an application for measuring an amount of exercise or blood sugar levels), an application to which security information is input (for example, a banking application), a web browser, and a game application.

The execution state determining module 240 may determine an execution state of a predetermined application. For example, the execution state determining module 240 determines whether to output a notification associated with an interruption, whether to delay notification, a point in time for notification, or the like, based on the determined execution state of an application.

The execution state of an application may include at least one of a media content playback state, a user movement measurement state, a user movement detection state, a game content execution state, a content (for example, text, an e-book, a webpage, or an image) display state, a content (for example, text, an image, voice, or security information) input state, and a content (for example, voice or an image) recording state, and various operations and execution states of various other applications may be possible.

The user input determining module 250 may determine whether a user input or a user movement is detected from an input signal, through at least one sensor of the electronic device 101.

The notification display controlling module 260 may control a notification associated with an interruption (a call reception event, a message reception event, a missed call notification event, or an SNS notification reception event) to be outputted or to be displayed through the display 160 of the electronic device 101, based on an execution state of an application. For example, whether to output a notification associated with an interruption may be determined based on an execution state of an application. The notification associated with the interruption may include a notification associated with an interruption that currently occurs or a notification associated with an interruption that previously occurs.

For example, the electronic device may include a processor and a display, and when at least one interruption occurs while an application is executed, the processor, according to various embodiments of the present disclosure, may determine an execution state of the currently executed application and control whether to output a notification associated with the interruption based on an execution state of the application, and the display may display the notification associated with the interruption.

The processor, according to various embodiments of the present disclosure, may delay the notification associated with the interruption based on the execution state of the application, determine a point in time for outputting the delayed notification, and control the display to display a notification associated with at least one interruption that occurs before the determined point in time.

The application, according to various embodiments of the present disclosure, may be one of a media playback application, a recording application, a documenting application, an electronic book application, a health care application, a bank application, a web browser, and a game application.

The execution state of the application, according to various embodiments of the present disclosure, may include at least one of a media content playback state, a user movement measurement state, a user movement detection state, a game content execution state, a content display state, a content input state, and a content recording state.

When the at least one interruption occurs while the media playback application is executed, the processor, according to various embodiments of the present disclosure, may determine a point in time when a sound of media that is currently played back is output to be lower than a predetermined reference sound, as the point in time for notification.

When the at least one interruption occurs while the media playback application is executed, the processor, according to various embodiments of the present disclosure, may determine a point in time when playback of a first media that is currently played back through the media playback application is terminated, as the point in time for notification.

When the at least one interruption occurs while the health care application is executed, the processor, according to various embodiments of the present disclosure, may determine a period when a user movement is not detected, as the point in time for notification.

When the at least one interruption occurs while the game application is executed, the processor, according to various embodiments of the present disclosure, may determine a period when a user gesture input is not detected, as the point in time for notification.

When the at least one interruption occurs while a recording is executed through the recording application, the processor, according to various embodiments of the present disclosure, may determine a point in time when recording is completed, as the point in time for notification.

When the at least one interruption occurs while the documenting application is executed, the processor, according to various embodiments of the present disclosure, may determine a period when a text input is not detected, as the point in time for notification.

When the at least one interruption occurs while the electronic book application or the web browser is executed, the processor, according to various embodiments of the present disclosure, may determine a point in time when biometric information of a user is not input in a predetermined pattern, as the point in time for notification.

When the at least one interruption occurs while authentication information is input through the bank application, the processor, according to various embodiments of the present disclosure, may determine a point in time after the authentication information is completely input, as the point in time for notification.

The at least one interruption, according to various embodiments of the present disclosure, may include at least one of a call reception notification, a missed call notification, a message reception notification, and an SNS notification.

Figure 3:
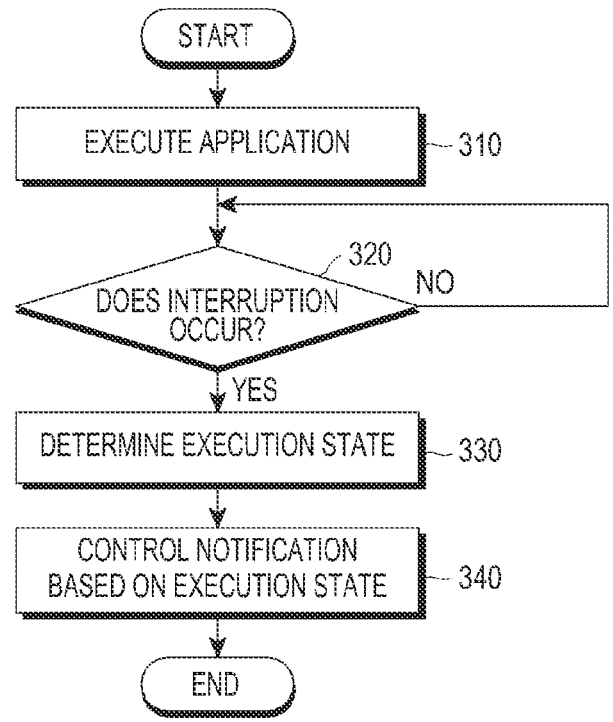
FIG. 3 is a flowchart of an operation for controlling a notification in an electronic device, according to an embodiment of the present invention.

FIG. 3 is a flowchart of an operation for controlling a notification in an electronic device, according to an embodiment of the present invention.

Referring to FIG. 3, an application is executed in the electronic device 101 in operation 310.

In operation 320, the electronic device 101 determines whether an interruption occurs.

When an interruption is determined to have occurred, the electronic device 101 determines an execution state of the application in operation 330.

In operation 340, the electronic device 101 controls a notification, based on the determined execution state of the application. For example, the electronic device 101 may delay outputting the received notification, and may control a point in time for outputting the delayed notification.

At least one of the operations illustrated in FIG. 3 may be omitted, or at least one other operation may be added between the operations. In addition, the operations may be sequentially processed as illustrated in FIG. 3, and the execution sequence of at least one operation may be switched with that of another operation.

For example, when at least one interruption occurs while an application is executed, a method for the electronic device to control a notification, according to various embodiments of the present disclosure, may include determining an execution state of a currently executed application and controlling whether to output a notification associated with the interruption based on the execution state of the application In the method for the electronic device to control a notification, according to various embodiments of the present disclosure, the operation of controlling whether to output the notification associated with the interruption may include delaying the notification associated with the interruption based on the execution state of the application, determining a point in time for outputting the delayed notification, and displaying a notification associated with at least one interruption that occurs before the determined point in time.

The application, according to various embodiments of the present disclosure, may be one of a media playback application, a recording application, a documenting application, an electronic book application, a health care application, a bank application, a web browser, and a game application.

The execution state of the application, according to various embodiments of the present disclosure, may include at least one of a media content playback state, a user movement measurement state, a user movement detection state, a game content execution state, a content display state, a content input state, and a content recording state.

When the at least one interruption occurs while the media playback application is executed, the method for the electronic device to control a notification, according to various embodiments of the present disclosure, may further include determining a point in time when a sound of media that is currently played back is output to be lower than a predetermined reference sound, as the point in time for notification.

When the at least one interruption occurs while the media playback application is executed, the method for the electronic device to control a notification, according to various embodiments of the present disclosure, may further include determining a point in time when playback of a first media that is currently played back through the media playback application is completed, as the point in time for notification.

When the at least one interruption occurs while the health care application is executed, the method for the electronic device to control a notification, according to various embodiments of the present disclosure, may further include determining a period when a user movement is not detected, as the point in time for notification.

When the at least one interruption occurs while the game application is executed, the method for the electronic device to control a notification, according to various embodiments of the present disclosure, may further include determining a period when a user gesture input is not detected, as the point in time for notification.

When the at least one interruption occurs while recording is executed through the recording application, the method for the electronic device to control a notification, according to various embodiments of the present disclosure, may further include determining a point in time when recording is completed, as the point in time for notification.

When the at least one interruption occurs while the documenting application is executed, the method for the electronic device to control a notification, according to various embodiments of the present disclosure, may further include determining a period when a text input is not detected, as the point in time for notification.

When the at least one interruption occurs while the electronic book application or the web browser is executed, the method for the electronic device to control a notification, according to various embodiments of the present disclosure, may further include determining a point in time when biometric information of a user is not input in a predetermined pattern, as the point in time for notification.

When the at least one interruption occurs while authentication information is input through the bank application, the method for the electronic device to control a notification, according to various embodiments of the present disclosure, may further include determining a point in time after the authentication information is completely input, as the point in time for notification.

The at least one interruption, according to various embodiments of the present disclosure, may include at least one of a call reception notification, a missed call notification, a message reception notification, and an SNS notification.

Figure 4:
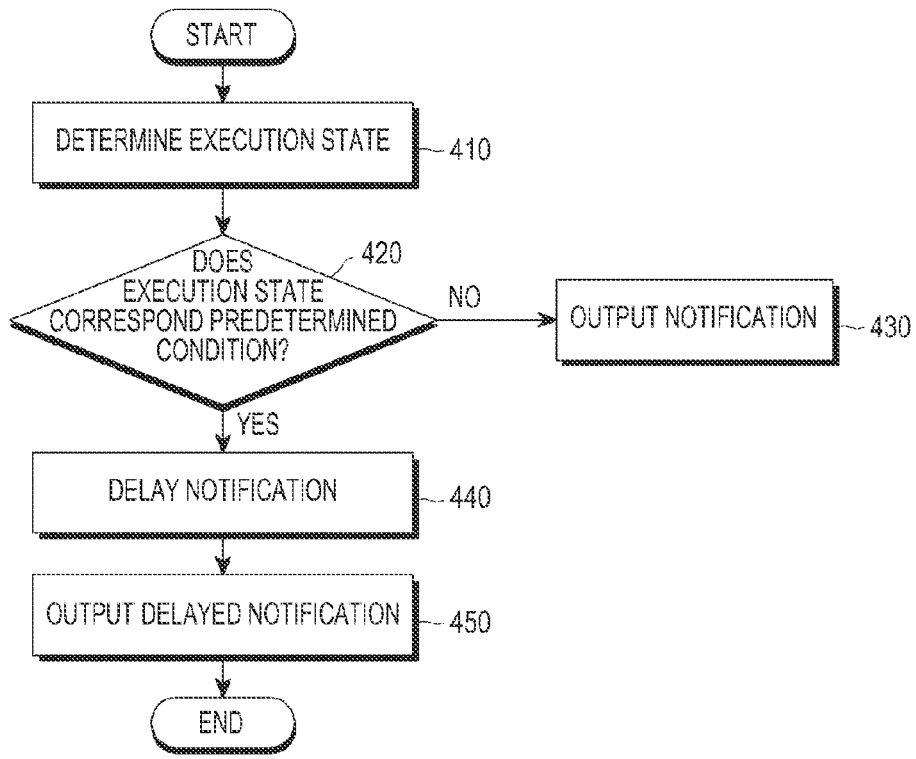
FIG. 4 is a flowchart of an operation of controlling a notification in an electronic device, according to an embodiment of the present invention.

FIG. 4 is a flowchart of an operation for controlling a notification in an electronic device, according to an embodiment of the present invention.

Referring to FIG. 4, the electronic device 101 determines an execution state of an application in operation 410.

In operation 420, the electronic device 101 determines whether the execution state of the application satisfies a predetermined condition.

The electronic device 101 may set a condition for determining whether to output a notification, based on a type of an application and data processed in the corresponding application.

When it is determined that the execution state of the application satisfies the predetermined condition, the electronic device 101 outputs a received notification in operation 430.

When it is determined that the execution state of the application does not satisfy the predetermined condition, the electronic device 101 may not output the received notification at the present point in time, and may delay outputting the received notification in operation 440.

In operation 450, the electronic device 101 outputs the delayed notification. For example, the electronic device 101 may output the delayed notification at a point in time when a user motion or a gesture input is not detected, when playback of media content is completed, when a sound of a media content is output to be lower than a predetermined sound, etc.

At least one of the operations illustrated in FIG. 4 may be omitted, or at least one other operation may be added between the operations. In addition, the operations may be sequentially processed as illustrated in FIG. 4, and the execution sequence of at least one operation may be switched with that of another operation.

Figure 5:
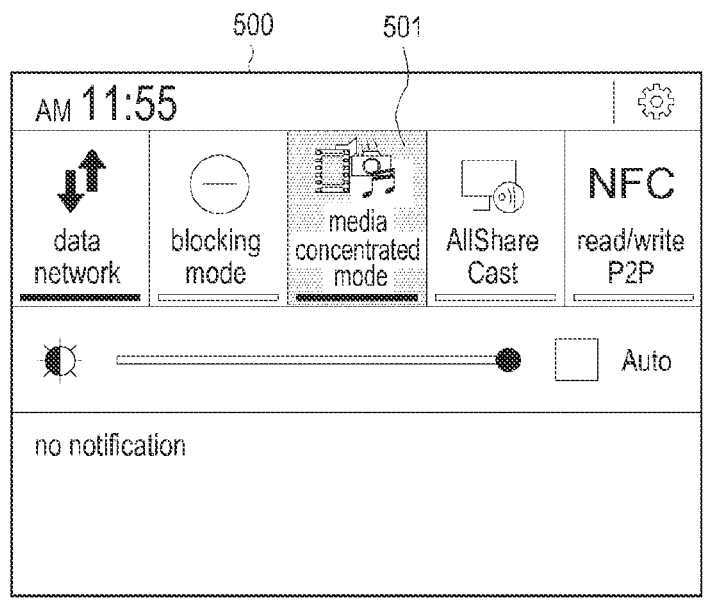
FIG. 5 is a diagram of a screen for setting a media-concentrated mode, according to an embodiment of the present invention.

FIG. 5 is a diagram of a screen for setting a media-concentrated mode, according to an embodiment of the present invention.

Referring to FIG. 5, electronic device 101 may provide a control screen 500 including at least one execution button for executing various functions.

The control screen 500 may include a button for setting a media-concentrated mode. For example, when a user selects the media-concentrated mode 501 button, the electronic device 101 may control whether to output a received notification based on an execution state of a currently executed application.

Figure 6A:
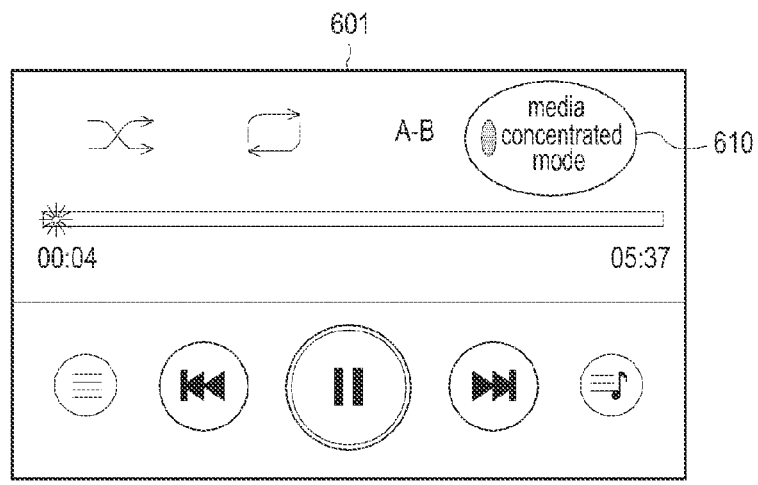
FIGS. 6A and 6B are diagrams of media application screens including a media-concentrated mode function, according to an embodiment of the present invention.
Figure 6B:
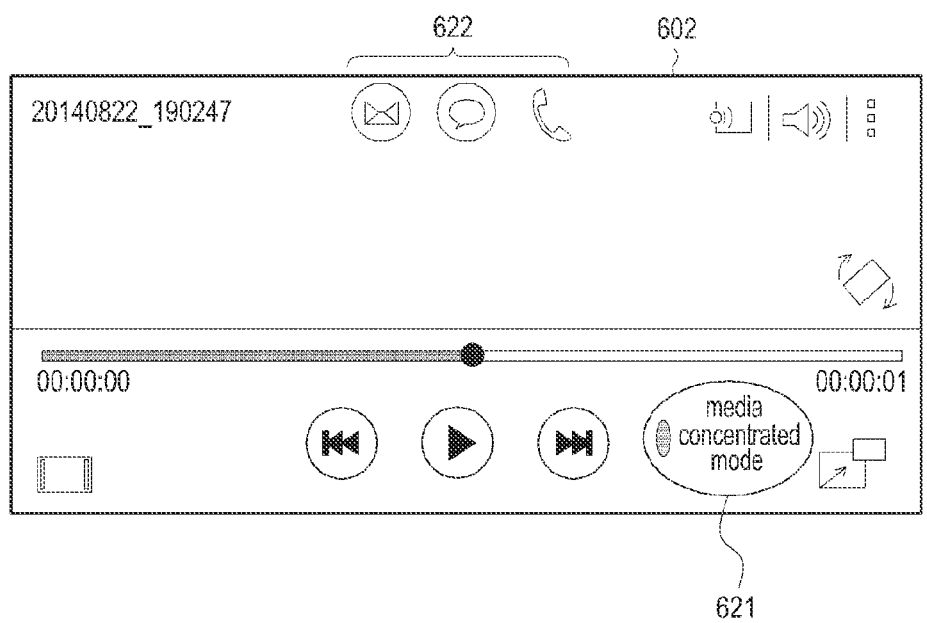

FIGS. 6A and 6B are diagrams of a media application screen including a media-concentrated mode function, according to an embodiment of the present invention.

Referring to FIGS. 6A and 6B, a screen where a media application is executed may include a button for executing a media-concentrated mode. When the button is selected by a user, electronic device 101 may set the media-concentrated mode, and provide information indicating that the media-concentrated mode is set. For example, the media application may be a music playback application or a video playback application.

Referring to FIG. 6A, the electronic device 101 may display a media-concentrated mode 610 button in an execution screen 601 of a music playback application.

When the user may click the media-concentrated mode 610 button and be activate the media-concentrated mode in the music playback application. For example, a point in time for outputting a notification associated, with at least one interruption occurring while the music playback application is executed may be determined based on a sound of a content that is currently being played in the music playback application or on a point in time of terminating the playback of the content in the music playback application.

Referring to FIG. 6B, the electronic device 101 may display a media-concentrated mode 621 button in an execution screen 602 of a video playback application.

When the user may click the media-concentrated mode 621 button and be activated the media-concentrated mode in the video playback application. The electronic device 101 may control a notification associated with an interruption, based on a playback state of a video content that is currently being played through the video playback application. For example, when an interruption occurs while the video is played, the electronic device 101 may not notify of the interruption at the present point in time, and may execute a control to display a notification 622 associated with the interruption at a predetermined point in time (for example, a point in time when a sound of the video is output to be lower than a reference sound).

FIG. 7 is a timing diagram indicating a point in time for outputting a notification received while a media application is executed and a media-concentrated mode is deactivated, according to an embodiment of the present invention.

Referring to FIG. 7, it is assumed that a media-concentrated mode is deactivated in electronic device 101, and a first track is played back through a music playback application.

For example, as illustrated in FIG. 7, at least one interruption may occur, i.e., a message reception event 701, a SNS notification reception event 702, and a call reception event 703, during a first track playback duration 710. The first track playback duration 710 is a duration where the first track is played back, and another track is to be played back a predetermined period of time after the playback of the first track is completed.

When the media-concentrated mode is deactivated, the notification associated with the at least one interruption that occurs during the first track playback duration 710, may be displayed through the display 160 while the music is played back. For example, when a predetermined interruption (for example, a call reception event 703) occurs, the electronic device 101 interrupts playback of the first track at the point in time which the interruption occurs, and displays a notification associated with the call reception event 703. When the notification associated with the call reception event 703 occurs, the first track playback duration may be switched into a call duration 720 where call reception handling is executed through a control of the user.

FIG. 8 is a timing diagram indicating a point in time for outputting a notification received while a media application is executed and a media-concentrated mode is activated, according to an embodiment of the present invention.

Referring to FIG. 8, it is assumed that a media-concentrated mode is activated in electronic device 101 and at least one track (for example, a first track) is played back through a music playback application.

For example, as illustrated in FIG. 8, at least one interruption may occur, i.e., a first message reception event 801, a call reception event 802, a second message event 803, and a SNS notification reception event 804, during a first track playback duration 810.

When the media-concentrated mode is activated, the electronic device 101 may not output a notification associated with the at least one interruption that occurs during the first track playback duration 810, at the point at which the interruption occurs. Instead, the electronic device 101 may delay the notification associated with the at least one interruption to be displayed during an interval duration 820. The interval duration 822, which is an interval between the first track playback duration 810 and a second track playback duration 830, may be a period when media content is not played back.

The delayed notification associated with the at least one interruption may be displayed in the interval duration 820. The displayed notification may be provided in a form of a notification message. For example, as illustrated in FIG. 8, the notification message is a notification associated with the first message reception event 801, the call reception event 802, the second message reception event 803, and the SNS notification reception event 804. The notification message may include information indicating that "2 messages, 1 call, and 1 SNS notification have been received."

Figure 9:
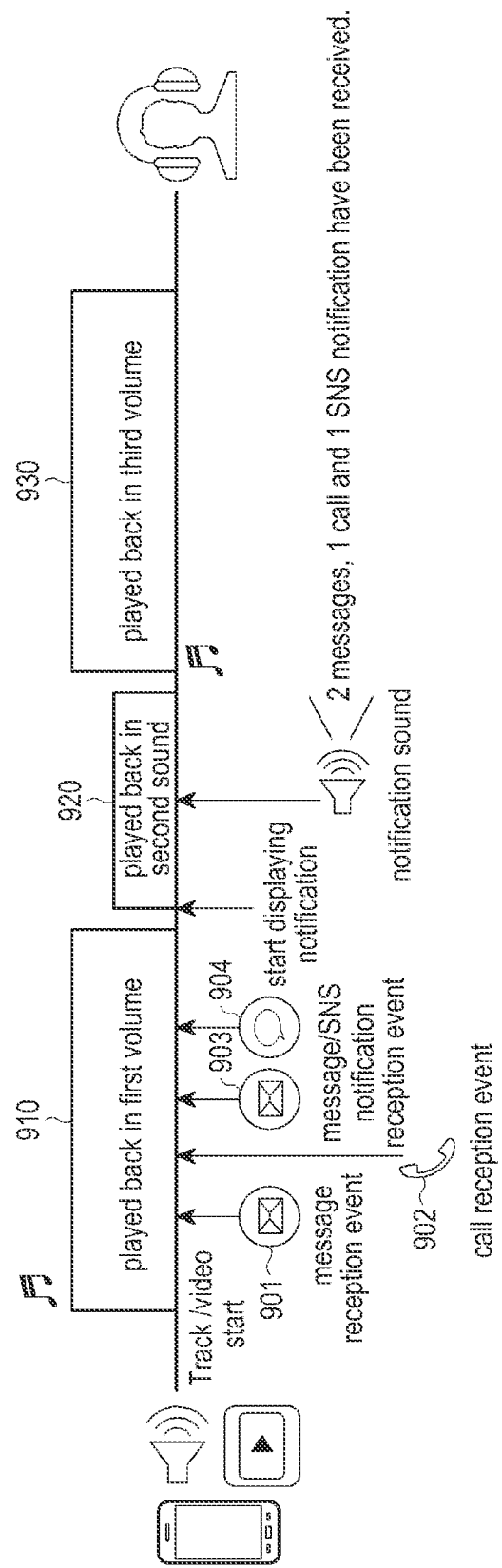
FIG. 9 is a timing diagram indicating a point in time for outputting a notification received while a media application is executed and a media-concentrated mode is activated, according to an embodiment of the present invention.

FIG. 9 is a timing diagram indicating a point in time for outputting a notification received while a media application is executed and a media-concentrated mode is activated, according to an embodiment of the present invention.

Referring to FIG. 9, it is assumed that a media-concentrated mode is activated in electronic device 101 and at least one media content is currently played back through a music or video playback application. For example, the media content may be played back at various sound volumes (for example, a first sound volume 910, a second sound volume 920, or a third sound volume 930). The second sound volume 920 may be output in a sound volume lower than the first sound volume 910 or the third sound volume 930, and may be a sound value lower than a predetermined reference sound volume.

When the media-concentrated mode is activated, the electronic device 101 may display a notification associated with an interruption that previously occurred or generate sound so as to output indicating that an interruption occurs, at a point in time when media content is played back in a sound volume less than or equal to a predetermined sound volume while the media content is being played back.

For example, as illustrated in FIG. 9, at least one interruption may occur, i.e., a first message reception event 901, a call reception event 902, a second message reception event 903, and SNS notification reception event 904, while a media content is played back in a first volume 910.

When the media-concentrated mode is activated and an interruption occurs while media content is being played back, the electronic device 101 may control to not output a notification associated with the at least one interruption at the point at which the interruption occurs. Instead, and the electronic device 101 may delay the notification associated with the at least one interruption to be displayed during a duration where the media content is played back in a second sound volume that is output in a volume lower than a predetermined sound volume.

The delayed notification associated with the interruption may be displayed during the duration where the media content is played back in the second sound volume. The displayed notification may be provided in the form of a notification message. For example, as illustrated in FIG. 9, the notification message is a message associated with the first message reception event 901, the call reception event 902, and the second message reception event 903, and the SNS notification reception event 904. The notification message outputs information indicating that "2 messages, 1 call, and 1 SNS notification have been received."

Figure 10:
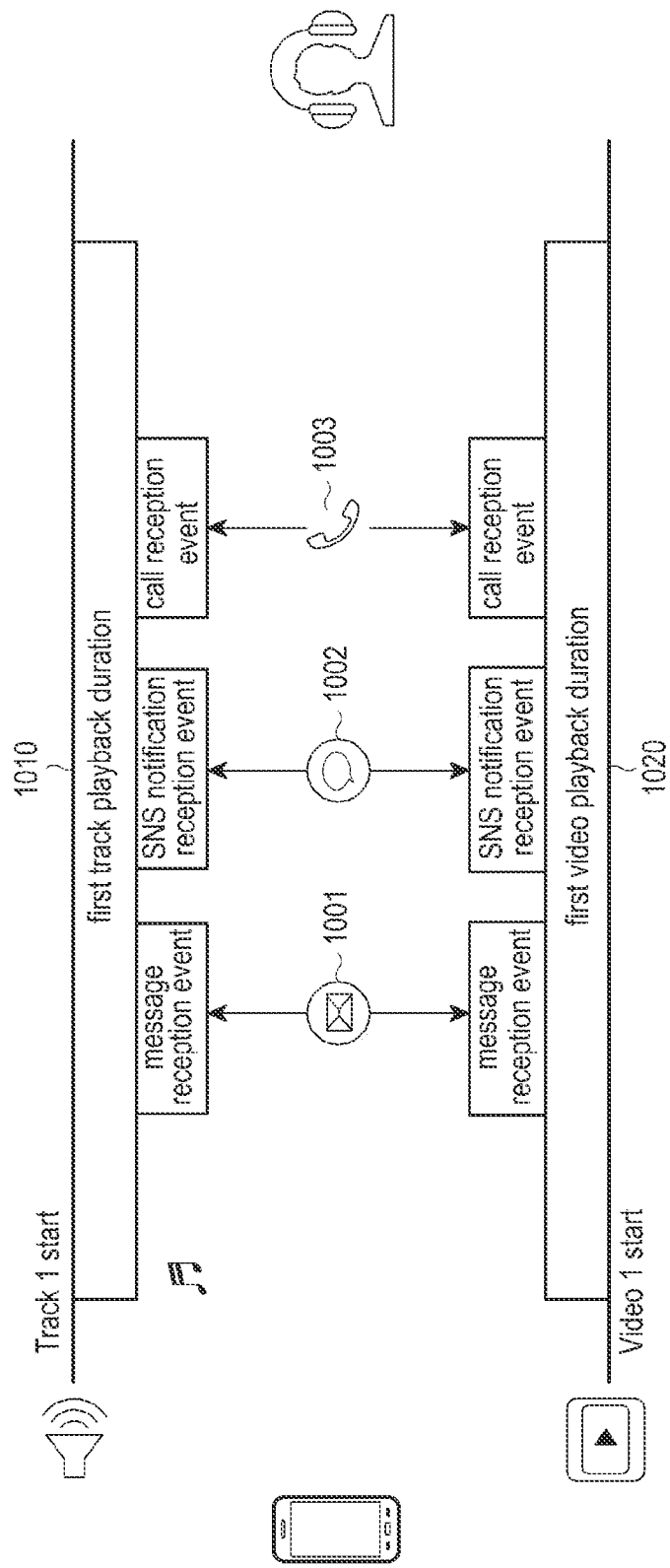
FIG. 10 is a timing diagram indicating a point in time for outputting a notification received while a media application is executed and a media-concentrated mode is activated, according to an embodiment of the present invention.

FIG. 10 is a timing diagram indicating a point in time for outputting a notification received while a media application is executed and a media-concentrated mode is activated, according to an embodiment of the present invention.

Referring to FIG. 10, it is assumed that a media-concentrated mode is activated in electronic device 101 and at least one media content (for example, media content in a playlist set in advance by a user) is played back through a music or video playback application.

For example, as illustrated in FIG. 10, at least one interruption may occur, i.e., a message reception event 1001, a SNS notification reception event 1002, and a call reception event 1003, while media content included in the predetermined playback list is played back (such as, during a first track playback duration 1010 or a first video playback duration 1020).

When the media-concentrated mode is activated and a predetermined media content is currently played back, the electronic device 101 may not display a notification associated with the at least one interruption at the time of the interruption, and instead delays notification until after playback of the media contents included in the predetermined playback list is complete.

Figure 11:
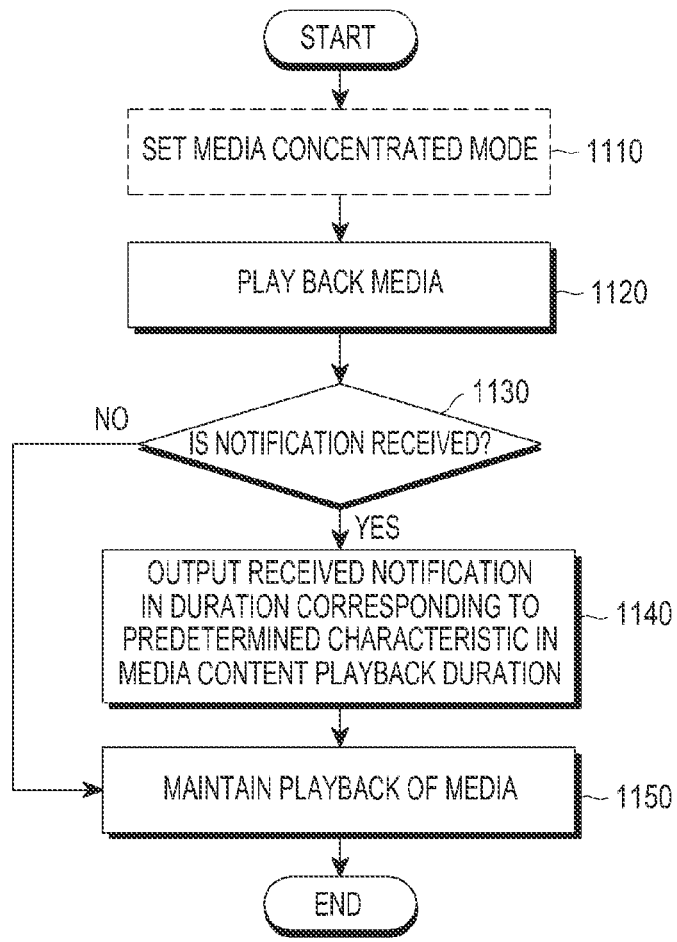
FIG. 11 is a flowchart of an operation for controlling a notification in an electronic device when a media application is executed, according to an embodiment of the present invention.

FIG. 11 is a flowchart of an operation for controlling a notification in an electronic device, according to an embodiment of the present invention.

Referring to FIG. 11, in operation 1110, the electronic device 101 sets a media-concentrated mode. That is, the electronic device may set the media-concentrated mode to be activated.

The media-concentrated mode may be set to be activated when the electronic device 101 determines that a predetermined application is executed, or may be activated by a user. When the media-concentrated mode is activated by the user, operation 1110 may be omitted.

The media-concentrated mode may be included in a menu item of a predetermined application so as to be activated with respect to the corresponding application, or may be set with respect to all applications installed in the electronic device 101.

In operation 1120, the electronic device 101 determines that media content is played back.

In operation 1130, the electronic device determines whether at least one notification is received. For example, the at least one notification may be at least one interruption that occurs while the media content is played back.

When it is determined that a notification is received, the electronic device 101 outputs the received notification during a duration that satisfies a set characteristic in the media content playback duration in operation 1140.

The duration that satisfies the set characteristic may include an interval between tracks or a duration where the media content is output in a sound lower than a predetermined sound.

When it is determined that a notification is not received, the electronic device 101 proceeds to operation 1150.

In operation 1150, the electronic device 101 maintains playback of the media content.

At least one of the operations illustrated in FIG. 11 may be omitted, or at least one other operation may be added between the operations. In addition, the operations may be sequentially processed as illustrated in FIG. 11, and the execution sequence of at least one operation may be switched with that of another operation.

Figure 12:
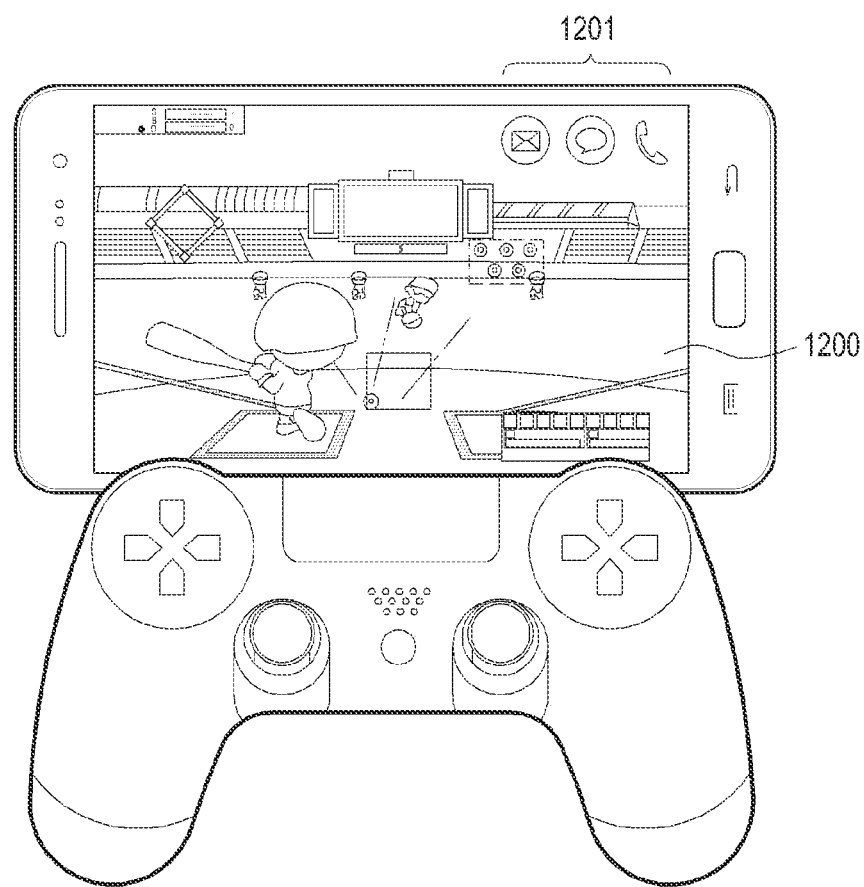
FIG. 12 is a diagram of a game application screen to which a media-concentrated mode function is applied, according to an embodiment of the present invention.

FIG. 12 is a diagram of a game application screen to which a media-concentrated mode function is applied, according to an embodiment of the present invention.

Retelling to FIG. 12, a game application screen 1200 displays notification icons 1201 associated with at least one interruption that occurs while a gaming operation is executed through the game application.

Figure 13:
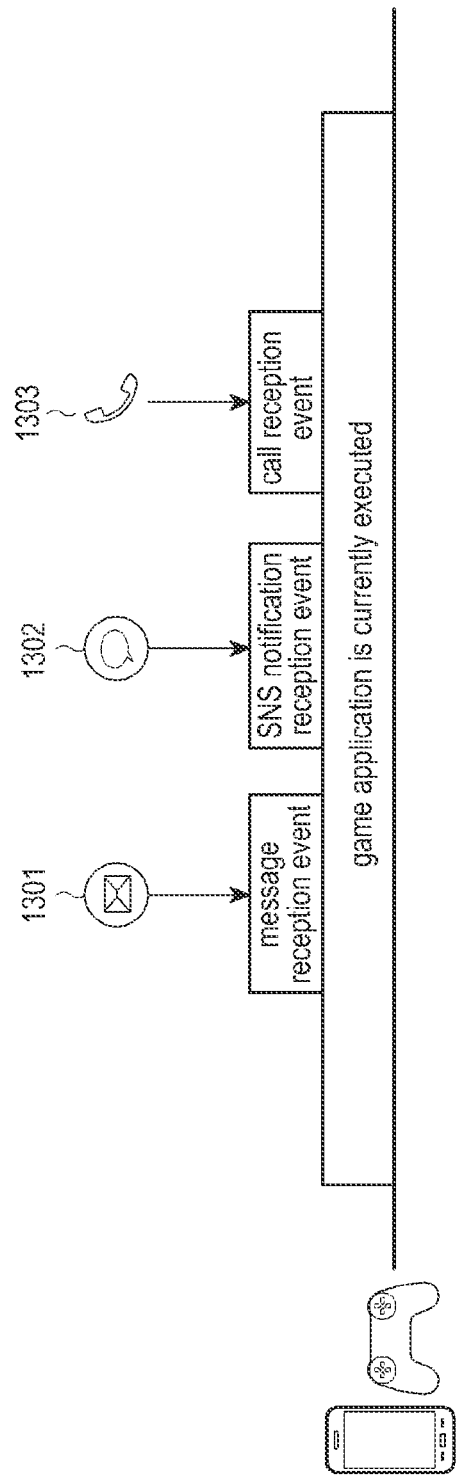
FIG. 13 is a timing diagram of a point in time for outputting a notification received while a game application is executed and a media-concentrated mode is deactivated, according to an embodiment of the present invention.

FIG. 13 is a timing diagram of a point in time for outputting a notification received while a game application is executed and a media-concentrated mode is deactivated, according to an embodiment of the present invention.

Referring to FIG. 13, game application is executed in electronic device 101.

When the media-concentrated mode is deactivated, the electronic device 100 displays a notification associated with at least one interruption that occurs while the game application is executed. For example, as illustrated in FIG. 13, a text message reception event 1301, an SNS notification reception event 1302, and a call reception event 1303 may occur while the game application is being executed. In this case, the electronic device 101 displays a notification associated with each of the text message reception event 1301, the SNS notification reception event 1302, and the call reception event 1303, while the game application is executed.

Figure 14:
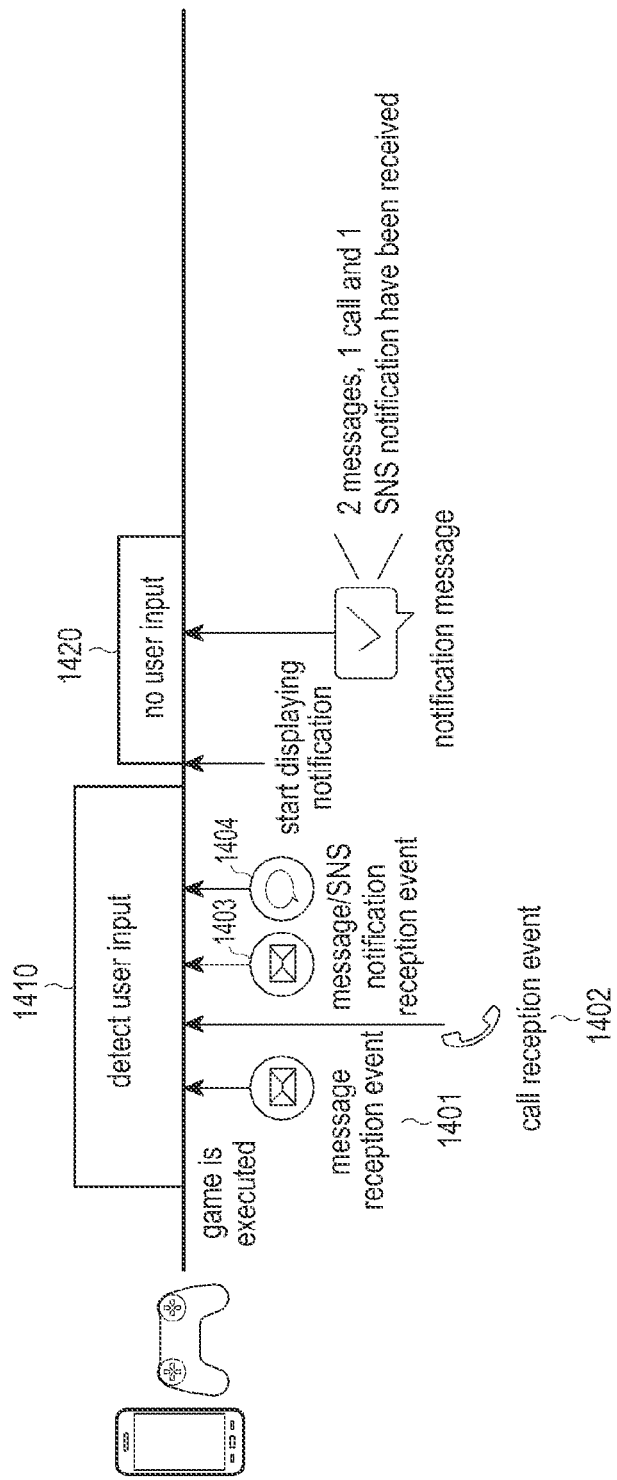
FIG. 14 is a timing diagram indicating a point in time for outputting a notification received while a game application is executed and a media-concentrated mode is activated, according to an embodiment of the present invention.

FIG. 14 is a timing diagram indicating a point in time for outputting a notification received while a game application is executed and a media-concentrated mode is activated, according to an embodiment of the present invention.

Referring to FIG. 14, a game application is executed in electronic device 101.

When the media-concentrated mode is activated, the electronic device 101 delays a notification associated with an interruption that occurs while the game application is executed, based on whether a user input is detected while the game application is executed. For example, as illustrated in FIG. 14, at least one interruption occurs, i.e. a first message reception event 1401, a call reception event 1402, a second message reception event 1403, and a SNS notification event 1404, during a duration 1410 when the game application is executed and a user input through the game application is detected.

When the media-concentrated mode is activated and the at least one interruption (for example, a message reception event 1401, a call reception event 1402, or a message/SNS notification reception event 1403) occurs in the duration 1410 while the game application is executed and a user input for operating the game application is detected, the electronic device 101 delays a notification associated with the at least one interruption to be displayed in a duration 1420 where a user input is not detected. For example the duration 1420 may be a duration that a user input is not detected through at least one sensor included in the electronic device 101.

The electronic device 101 controls the delayed notification associated with the at least one interruption to be displayed in the duration 1420 where a user input is not detected. The displayed notification is provided in the form of a notification message. For example, as illustrated in FIG. 14, the notification message is a notification associated with the first message reception event 1401, the call reception event 1402, the second message reception event, the SNS notification reception event 1403, which occurs in the duration 1410 while a user input is detected when a game application is executed. The notification message outputs information indicating that "2 messages, 1 call, and 1 SNS notification have been received."

Figure 15:
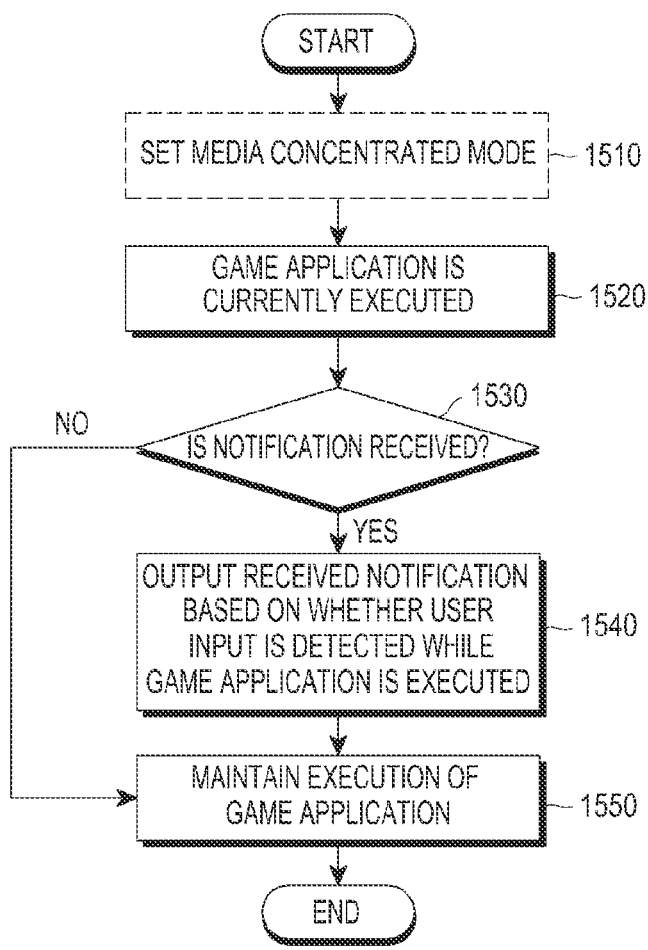
FIG. 15 is a flowchart of an operation for controlling a notification in an electronic device when a game application is executed, according to an embodiment of the present invention.

FIG. 15 is a flowchart of an operation for controlling a notification in an electronic device when a game application is executed, according to an embodiment of the present invention.

Referring to FIG. 15, in operation 1510, the electronic device 101 sets a media-concentrated mode. That is, the electronic device sets the media-concentrated mode to be activated.

The media-concentrated mode may be activated when the electronic device 101 determines that a predetermined application is executed, or may be activated by a user. When the media-concentrated mode is activated by the user, operation 1510 may be omitted.

The media-concentrated mode may be included in a menu item of a predetermined application so as to be activated with respect to the corresponding application, or may be set with respect to all applications installed in the electronic device 101.

In operation 1520, the electronic device 101 determines that a gaming operation is currently executed through a game application.

In operation 1530, the electronic device 101 determines whether at least one notification is received. For example, the at least one notification may be at least one interruption that occurs while the gaining operation is executed through the game application.

When it is determined that a notification is received, the electronic device 101 outputs the received notification based on whether a user input is detected while the gaming operation is executed in the game application in operation 1540.

When it is determined that a notification is not received, the electronic device 101 proceeds to operation 1550.

In operation 1550, the electronic device 101 maintains execution of the gaming operation through the game application. For example, when at least one interruption occurs, the electronic device 101 does not terminate or pause the game application, but maintains the execution of the gaming operation and executes a control to display a notification associated with the at least one interruption.

At least one of the operations illustrated in FIG. 15 may be omitted, or at least one other operation may be added between the operations. In addition, the operations may be sequentially processed as illustrated in FIG. 15, and the execution sequence of at least one operation may be switched with that of another operation.

Figure 16:
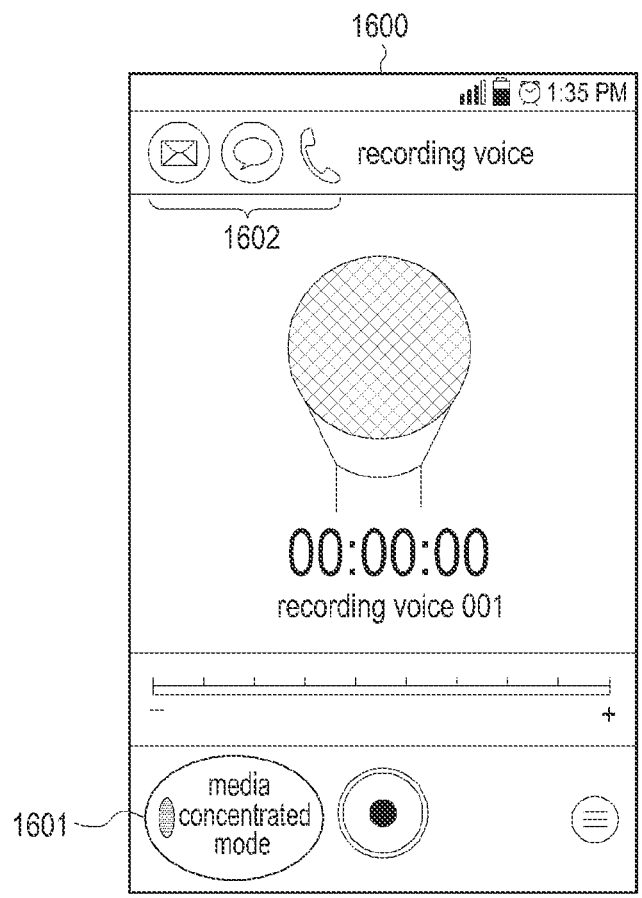
FIG. 16 is a diagram of a recording application screen to which a media-concentrated mode function is applied, according to an embodiment of the present invention.

FIG. 16 is a diagram of a recording application screen to which a media-concentrated mode function is applied, according to an embodiment of the present invention.

Referring to FIG. 16, a recording application (for example, a voice recording application) screen 1600 includes a media-concentrated mode button 1601 for activating a media-concentrated mode and notification icons 1602 indicating that at least one interruption occurs.

When the media-concentrated mode button 1601 is selected by a user input, the media-concentrated mode is activated and the electronic device 101 controls a notification associated with at least one interruption that occurs while a recording operation is executed in the recording application.

Figure 17:
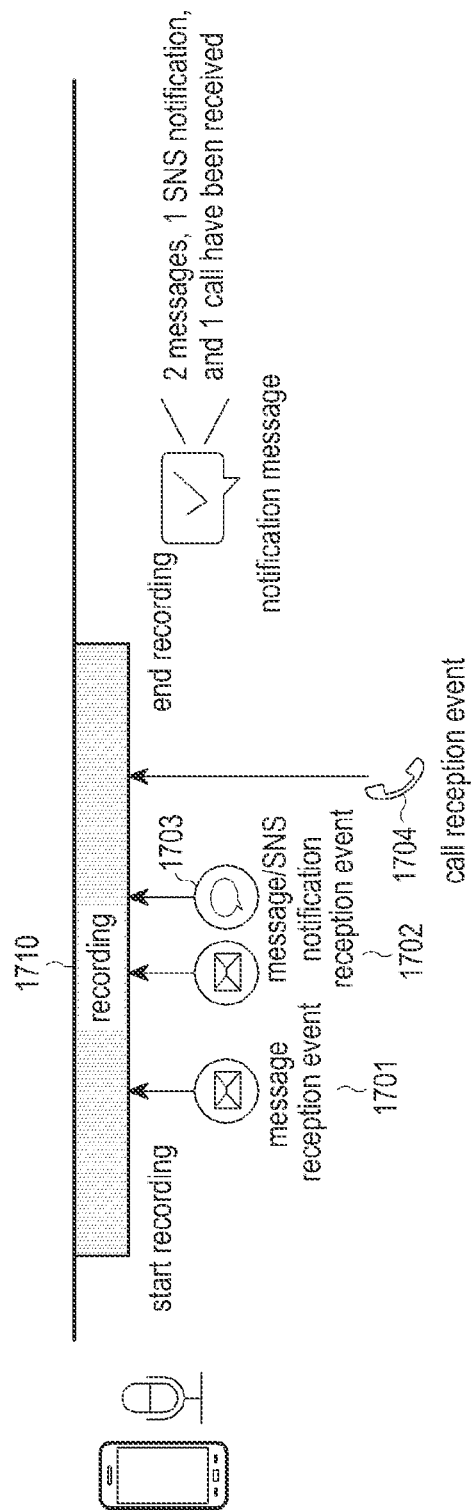
FIG. 17 is a timing diagram indicating a point in time for outputting a notification received while a recording application is executed and a media-concentrated mode is activated, according to an embodiment of the present invention.

FIG. 17 is a timing diagram indicating a point in time for outputting a notification received while a recording application is executed and a media-concentrated mode is activated, according to an embodiment of the present invention.

Referring to FIG. 17, a recording application (for example, a voice recording application) is executed in electronic device 101.

When the media-concentrated mode is activated, the electronic device 101 delays a notification associated with at least one interruption that occurs while a recording operation (for example, a video recording or a voice recording) is executed. In this case, the electronic device 101 delays a notification associated with the at least one interruption, until the recording operation is terminated. For example, as illustrated in FIG. 17, when at least one interruption occurs, i.e., a first message reception event 1701, a second message reception event 1702, a SNS notification reception event 1703, or a call reception event 1704, while recording 1710 is executed through the recording application, the electronic device 101 delays a notification associated with the at least one interruption to be displayed after a point in time when the recording operation is terminated.

The electronic device 101 controls the delayed notification associated with the at least one interruption, to be displayed after a point in time when a recording operation is terminated. The displayed notification is provided in the form of a notification message. For example, as illustrated in FIG. 17, the notification message is a notification associated with the first message reception event 1701, the second message reception event 1702, the SNS notification reception event 1703, and the call reception event 1704, which occurs while recording 1710 is executed through the recording application. The notification message outputs information indicating that "2 messages, 1 call, and 1 SNS notification have been received."

Figure 18:
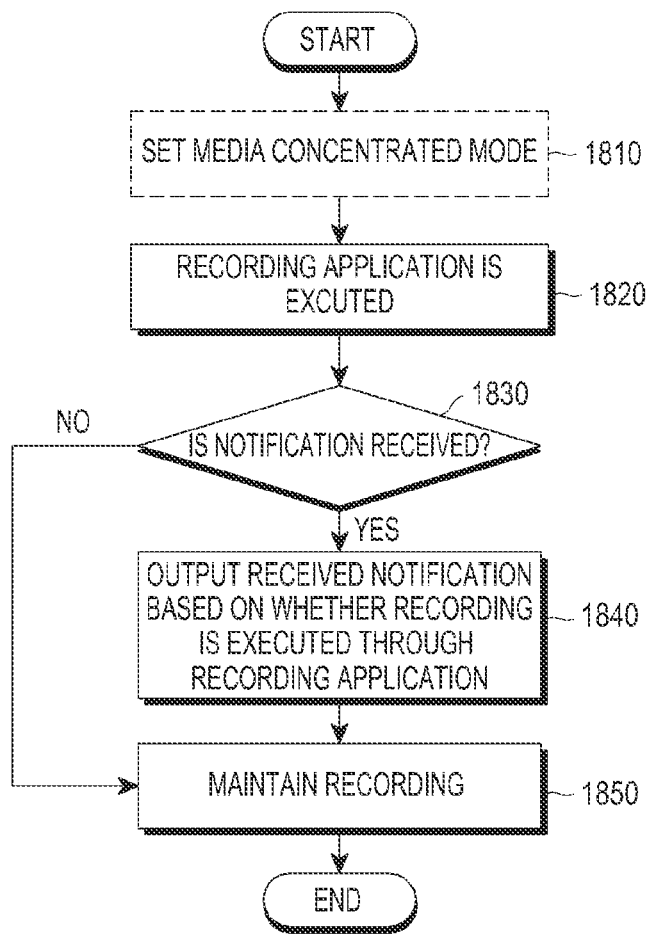
FIG. 18 is a flowchart of an operation for controlling a notification in an electronic device when a recording application is executed, according to an embodiment of the present invention.

FIG. 18 is a flowchart of an operation for controlling a notification in an electronic device when a recording application is executed, according to an embodiment of the present invention.

Referring to FIG. 18, in operation 1810, the electronic device 101 sets a media-concentrated mode. That is, the electronic device 101 sets the media-concentrated mode to be activated.

The media-concentrated mode may be set to be activated when the electronic device 101 determines that a predetermined application is executed, or may be activated by a user.

For example, when the media-concentrated mode is activated by the user, operation 1810 may be omitted.

The media-concentrated mode may be included in a menu item of a predetermined application so as to be activated with respect to the corresponding application, or may be set with respect to all applications installed in the electronic device 101.

In operation 1820, the electronic device 101 determines that a recording operation is currently executed through the recording application.

In operation 1830, the electronic device 101 determines whether at least one notification is received. For example, the at least one notification may be at least one interruption that occurs while a recording operation is executed through the recording application.

When it is determined that a notification is received, the electronic device 101 outputs the received notification based on whether a recording operation is executed in the recording application in operation 1840.

When it is determined that a notification is not received, the electronic device 101 proceeds to operation 1850.

In operation 1850, the electronic device 101 maintains the execution of the recording operation through the recording application. For example, when at least one interruption occurs, the electronic device 101 does not interrupt the recording operation executed through the recording operation, but maintains recording or the recording operation and executes a control to display a notification associated with the at least one interruption.

At least one of the operations illustrated in FIG. 18 may be omitted, or at least one other operation may be added between the operations. In addition, the operations may be sequentially processed as illustrated in FIG. 18, and the execution sequence of at least one operation may be switched with that of another operation.

Figure 19:
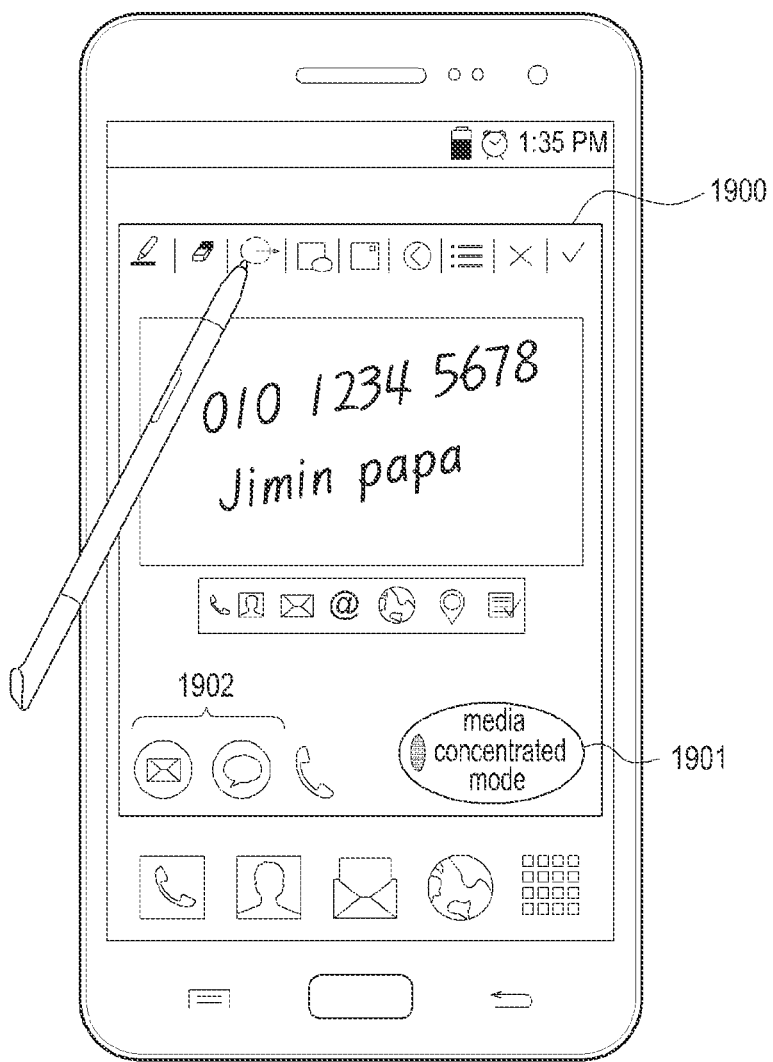
FIG. 19 is a diagram of a document editing application screen to which a media-concentrated mode function is applied, according to an embodiment of the present invention.

FIG. 19 is a diagram of a document editing application screen to which a media-concentrated mode function is applied, according to an embodiment of the present application.

Referring to FIG. 19, a document editing application (for example, a memo application) screen 1900 includes a media-concentrated mode button 1901 for activating a media-concentrated mode and notification icons 1902 indicating that at least one interruption occurs.

When the media-concentrated mode button 1901 is selected by a user input, the media-concentrated mode is activated and the electronic device 101 controls a notification associated with at least one interruption that occurs while a text input operation is executed in the document editing application.

FIG. 20 is a timing diagram indicating a point in time for outputting a notification received while a document editing application is executed and a media-concentrated mode is deactivated, according to an embodiment of the present invention.

Referring to FIG. 20, it is assumed that a media-concentrated mode is deactivated in electronic device 101 and a document editing application is currently executed. For example, as illustrated in FIG. 20, at least one interruption occurs, i.e., a message reception event 2001, a SNS notification reception event 2002, and a call reception event 2003, while the document editing application is executed, i.e. during the documenting application execution duration 2010.

When the media-concentrated mode is deactivated, a notification associated with the at least one interruption that occurs during the documenting application execution duration 2010, is displayed in a document editing application screen.

When a predetermined interruption (for example, a call reception event 2003) occurs, the electronic device 101 may display a screen that displays a notification associated with the call reception event 2003, instead of displaying the current document editing application screen. In this case, when the notification associated with the call reception event 2003 occurs, the execution of the document editing application is interrupted and switched into a call execution, for a call duration 2020, through a control of a user.

FIG. 21 is a timing diagram indicating a point in time for outputting a notification received while a document editing application is executed and a media-concentrated mode is activated, according to an embodiment of the present invention.

Referring to FIG. 21, it is assumed that a media-concentrated mode is activated in electronic device 101 and a document editing application is currently executed.

For example, as illustrated in FIG. 20, during a duration 2110 where a text input is detected through the document editing application, at least one interruption may occur, i.e., a first message reception event 2101, a second message reception event 2102, a SNS notification reception event 2103, and a call reception event 2104.

When the media-concentrated mode is activated, the electronic device 101 delays a notification associated with at least one interruption that occurs in the duration 2110 where a text input is detected, to be displayed in a duration 2120 where a text input is not detected. For example, the duration 2120 may be a duration that a user input is not detected through at least one sensor included in the electronic device 101.

The delayed notification associated with the at least one interaction is displayed in the duration 2120 where a text input is not detected. The displayed notification is provided in a form of a notification message. For example, as illustrated in FIG. 21, the notification is a notification associated with the first message reception event 2101, the second message reception event 2102, the SNS notification reception event 2103, and the call reception event 2014, which occurs when text input is detected during execution of the document editing application. The notification message outputs information indicating that "2 messages, 1 SNS notification, and 1 call have been received."

Figure 22:
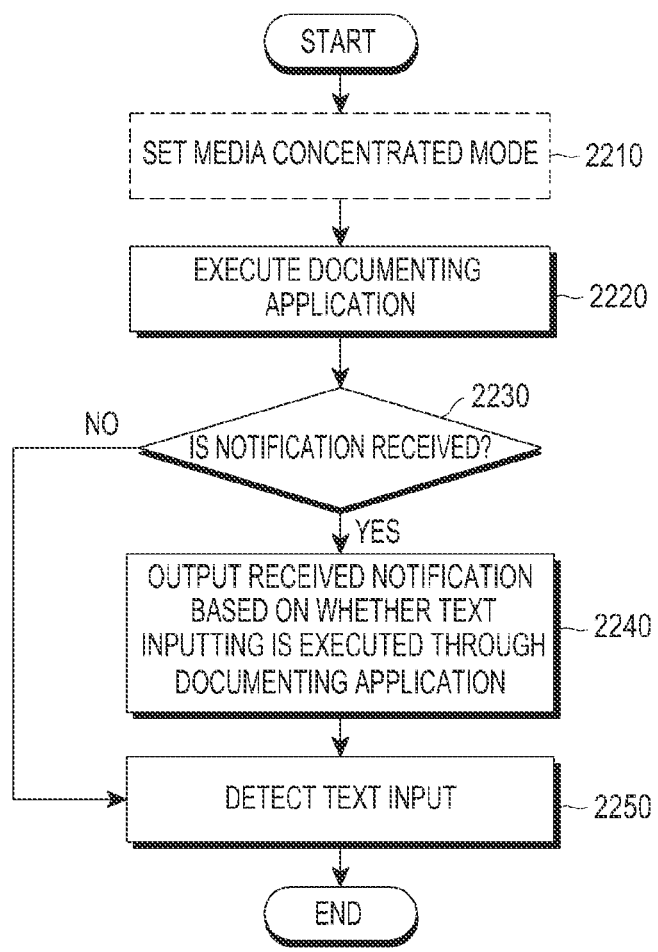
FIG. 22 is a flowchart of an operation for controlling a notification in an electronic device when a document editing application is executed, according to an embodiment of the present invention.

FIG. 22 is a flowchart of an operation for controlling a notification in an electronic device when a document editing application is executed, according to an embodiment of the present invention.

Referring to FIG. 22, in operation 2210, the electronic device 101 sets a media-concentrated mode. For example, the electronic device 101 sets the media-concentrated mode to be activated.

The media-concentrated mode may be set to be activated when the electronic device 101 determines that a predetermined application is executed, or may be activated by a user. For example, when the media-concentrated mode is activated by the user, operation 2210 may be omitted.

The media-concentrated mode may be included in a menu item of a predetermined application so as to be activated with respect to the corresponding application, or may be set with respect to all applications installed in the electronic device 101.

In operation 2220, the electronic device 101 determines that a text inputting operating is executed through a document editing application. For example, text inputting may include an operation of a user of inputting text through a keypad of the electronic device 101.

In operation 2230, the electronic device 101 determines whether at least one notification is received. For example, the at least one notification may be at least one interruption that occurs while a text inputting operation is executed through the document editing application.

When it is determined that a notification is received, the electronic device 101 outputs the received notification based on whether a text inputting operation is executed through the document editing application in operation 2240.

When it is determined that a notification is not received, the electronic device 101 proceeds to operation 2250.

In operation 2250, the electronic device 101 continuously detects text inputting through the document editing application. For example, when at least one interruption occurs, the electronic device 101 may execute a control to continuously detect text inputting through the document editing application, and to display a notification associated with an interruption.

At least one of the operations illustrated in FIG. 22 may be omitted, or at least one other operation may be added between the operations. In addition, the operations may be sequentially processed as illustrated in FIG. 22, and the execution sequence of at least one operation may be switched with that of another operation.

Figure 23:
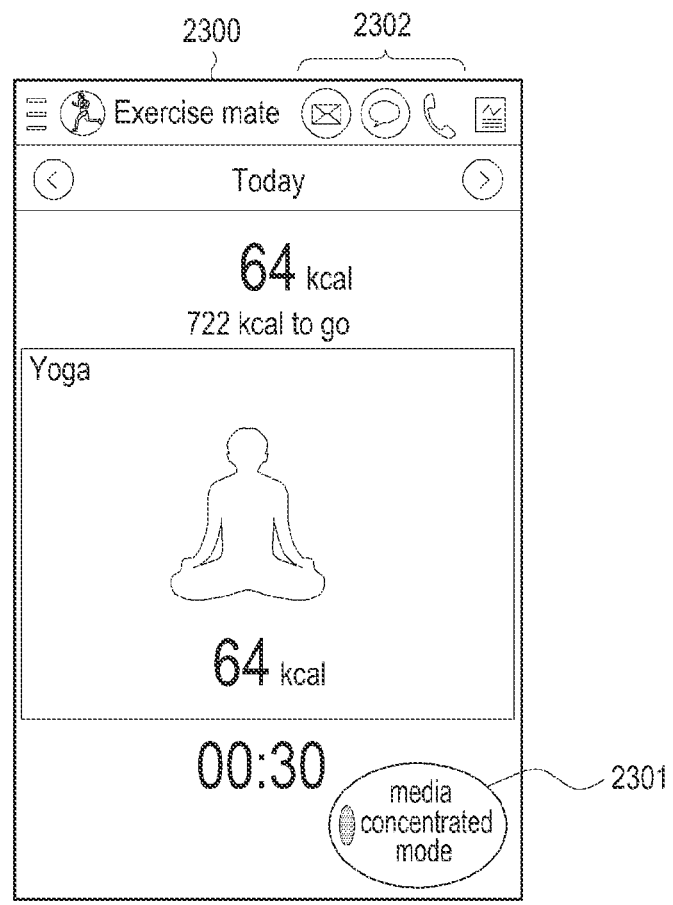
FIG. 23 is a diagram of a healthcare application screen to which a media-concentrated mode function is applied, according to an embodiment of the present invention.

FIG. 23 is a diagram of a healthcare application screen to which a media-concentrated mode function is applied, according to an embodiment of the present invention.

Referring to FIG. 23, a healthcare application (for example, an application for measuring a quantity of exercise) screen 2300 includes a media-concentrated mode button 2301 for activating a media-concentrated mode and notification icons 2302 indicating that at least one interruption occurs.

When the media-concentrated mode button 2301 is selected by a user input, the media-concentrated mode is activated and the electronic device 101 controls a notification associated with at least one interruption that occurs while an operation of measuring a quantity of exercise is executed in the healthcare application. For example, the operation of measuring the quantity of exercise includes an operation of detecting a user movement using at least one sensor included in the electronic device 101, and measuring a quantity of exercise based on the detected user movement.

Figure 24:
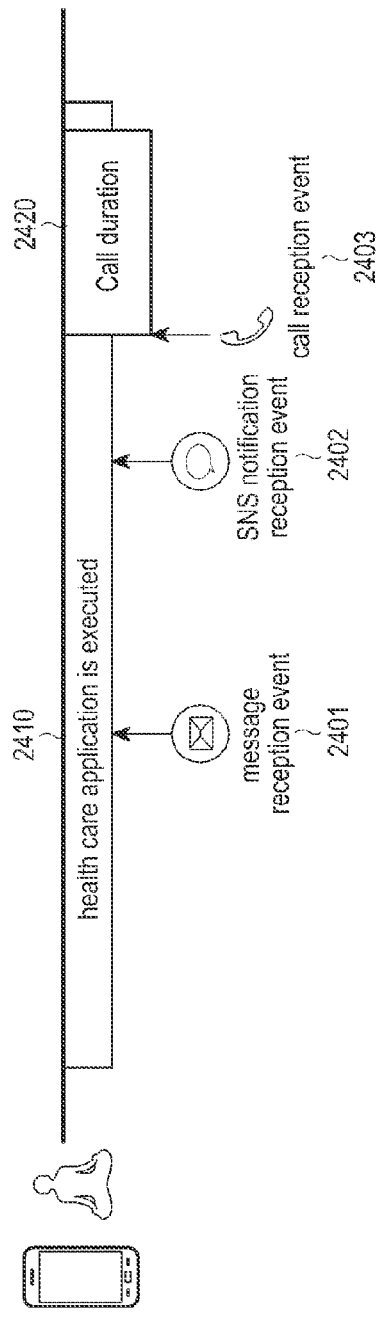
FIG. 24 is a timing diagram indicating a point in time for outputting a notification received while a healthcare application is executed and a media-concentrated mode is deactivated, according to an embodiment of the present invention.

FIG. 24 is a timing diagram indicating a point in time for outputting a notification received while a healthcare application is executed and a media-concentrated mode is deactivated, according to an embodiment of the present invention.

Referring to FIG. 24, it is assumed that a media-concentrated mode is deactivated in electronic device 101 and a healthcare application is currently executed. The health care application may be an application for detecting or analyzing a movement of a user through at least one sensor (for example, an operation counter or blood pressure sensor) included in the electronic device 101.

For example, as illustrated in FIG. 24, at least one interruption occurs, i.e. a message reception event 2401, and a SNS notification reception event 2402, during a duration 2410 while the healthcare application is executed.

When the media-concentrated mode is deactivated, a notification associated with the at least one interruption that occurs during the healthcare application execution duration 2410, is displayed in a healthcare application screen.

When a predetermined interruption (for example, a call reception event 2403) occurs, the electronic device 101 may display a screen that displays a notification of the call reception event 2403, instead of displaying the current healthcare application screen. For example, when the notification associated with the call reception event 2403 occurs, the execution of the healthcare application is interrupted and switched into a call execution, for a call duration 2420 where calling reception handling is executed, through a control of a user.

Figure 25:
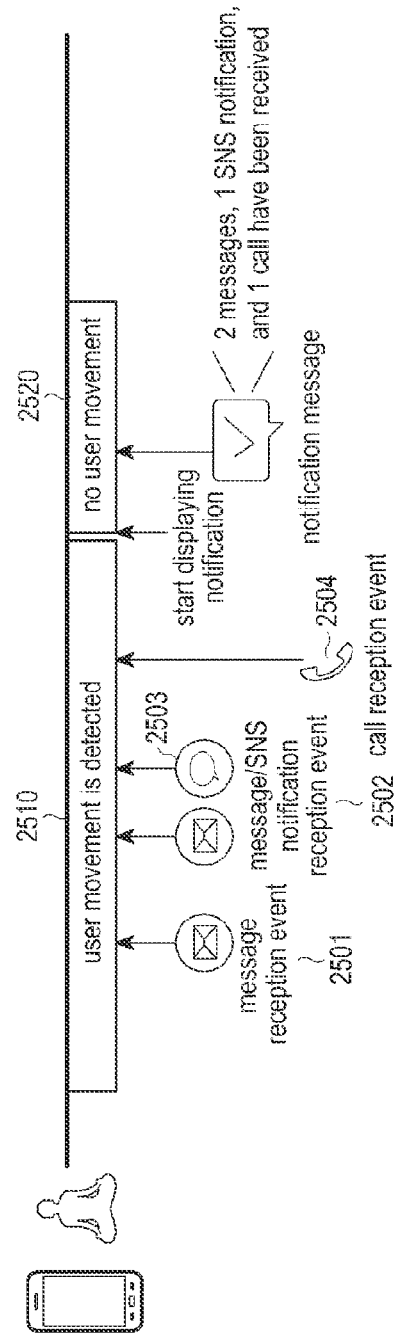
FIG. 25 is a timing diagram indicating a point in time for outputting a notification received while a healthcare application is executed and a media-concentrated mode is activated, according to an embodiment of the present invention.

FIG. 25 is a timing diagram indicating a point in time for outputting a notification received while a healthcare application is executed and a media-concentrated mode is activated, according to an embodiment of the present invention.

Referring to FIG. 25, it is assumed that a media-concentrated mode is set to be activated in an electronic device 101 and an operation of detecting a user movement is currently executed through a health care application. For example, during a duration 2510 where a user movement is detected through the healthcare application, at least one interruption may occur, i.e., a first message reception event 2501, a second message reception event 2502, a SNS notification reception event 2503, and a call reception event 2504.

When the media-concentrated mode is activated, the electronic device 101 delays a notification associated with the at least one interruption that occurs in the duration 2510 where a user movement is detected, to be displayed in a duration 2520 where a user movement is not detected. For example, the duration 2520 may be a duration that a user movement is not detected through at least one sensor included in the electronic device 101.

The delayed notification associated with the at least one interruption is displayed in the duration 2520 where the user movement is not detected. The displayed notification is provided in a form of a notification message. For example, as illustrated in FIG. 25, the notification message is a notification associated with the first message reception event 2501, the second message reception event 2502, the SNS notification reception event 2503, and the call reception event 2504 which occurs when the user movement is detected during the execution of the healthcare application. The notification message outputs information indicating that "2 messages, 1 SNS notification, and 1 call have been received."

Figure 26:
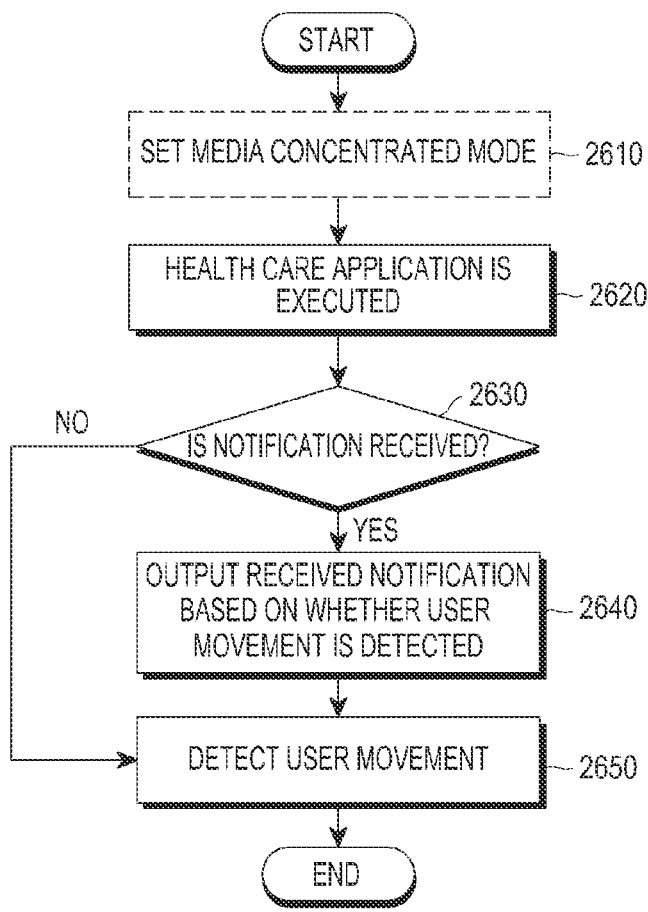
FIG. 26 is a flowchart of an operation for controlling a notification in an electronic device when a healthcare application is executed, according to an embodiment of the present invention.

FIG. 26 is a flowchart of an operation for controlling a notification in an electronic device when a healthcare application is executed, according to an embodiment of the present invention.

Referring to FIG. 26, in operation 2610, the electronic device 101 sets a media-concentrated mode. For example, the electronic device 101 sets the media-concentrated mode to be activated.

The media-concentrated mode may be set to be activated when the electronic device 101 determines that a predetermined application is executed, or may be activated by a user. For example, when the media-concentrated mode is activated by the user, operation 2610 may be omitted.

The media-concentrated mode may be included in a menu item of a predetermined application so as to be activated with respect to the corresponding application, or may be set with respect to all applications installed in the electronic device 101.

In operation 2620, the electronic device 101 determines that a healthcare application (for example, an exercise application) is executed.

In operation 2630, the electronic device 101 determines whether at least one notification is received. For example, the at least one notification may be at least one interruption that occurs while an operation of detecting a user movement is executed through the healthcare application.

When it is determined that a notification is received, the electronic device 101 outputs the received notification based on whether a user movement operation is detected in operation 2640.

The electronic device 101 delays outputting the received notification when a user movement is detected, and controls a previously received notification to be displayed when a user movement is not detected.

When it is determined that a notification is not received, the electronic device 101 proceeds to operation 2650.

In operation 2650, the electronic device 101 continuously detects a user movement through the healthcare application.

At least one of the operations illustrated in FIG. 26 may be omitted, or at least one other operation may be added between the operations. In addition, the operations may be sequentially processed as illustrated in FIG. 26, and the execution sequence of at least one operation may be switched with that of another operation.

Figure 27:
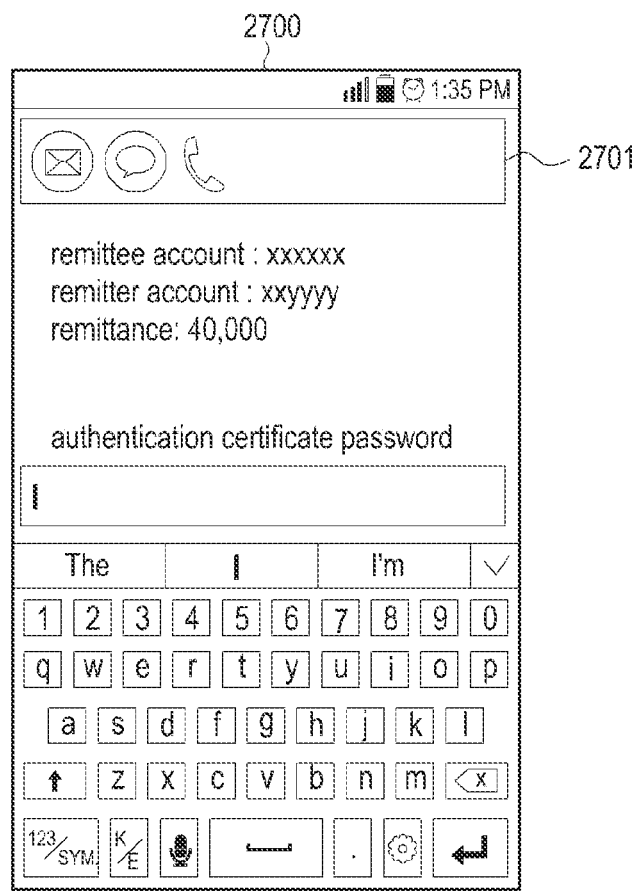
FIG. 27 is a diagram of a banking application screen to which a media-concentrated mode function is applied, according to an embodiment of the present invention.

FIG. 27 is a diagram of a banking application screen to which a media-concentrated mode function is applied, according to an embodiment of the present invention.

A media-concentrated mode may be set to be activated in advance in an electronic device 101. For example, the electronic device 101 may set the media-concentrated mode to be activated when determining execution of a banking application.

Referring to FIG. 27, a banking application screen 2700 to which authentication information (for example, security information or authentication certificate password) is to be input notification icons 2701 indicating that at least one interruption occurs.

When security information is input into the banking application, the electronic device 101 controls a notification associated with at least one interruption that occurs while the security information is input in the banking application.

Figure 28:
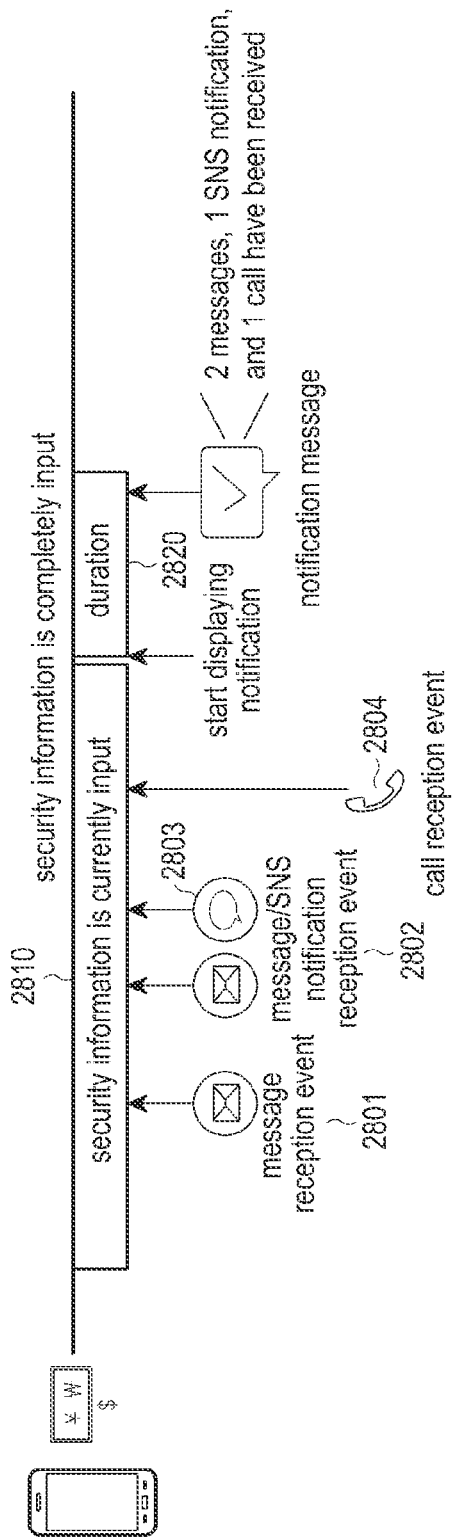
FIG. 28 is a timing diagram indicating a point in time for outputting a notification received while a banking application is executed and a media-concentrated mode is activated, according to an embodiment of the present invention.

FIG. 28 is a timing diagram indicating a point in time for outputting a notification received while a banking application is executed and a media-concentrated mode is activated, according to an embodiment of the present invention.

Referring to FIG. 28, it is assumed that a media-concentrated mode is activated in an electronic device 101 and authentication information is currently being input through a banking application in the electronic device 101.

For example, as illustrated in FIG. 28, during a duration 2810 where authentication information is currently being input, at least one interruption may occur, i.e., a first message reception event 2801, a second message reception event, 2802 a SNS notification reception event 2803, and a call reception event 2804.

When the media-concentrated mode is activated, the electronic device 101 delays a notification associated with the at least one interruption that occurs during the duration 2810 where authentication information is currently being input, to be displayed at point in time when inputting the authentication information is completed. For example, the point in time of completion of inputting the authentication information may be a point in time when security or encryption information or the like is input and the input security or encryption information is confirmed by a user.

The delayed notification associated with the at least one interruption is displayed in a duration 2820 where the security information is completely input. The displayed notification is provided in the form of a notification message. For example, as illustrated in FIG. 28, the notification message is a notification associated with the first message reception event 2801, the second message reception event 2802, the SNS notification reception event 2803, and the call reception event 2804 which occurs when the security information is being input in the banking application. The notification message outputs information indicating that "2 messages, 1 SNS notification, and 1 call have been received."

Figure 29:
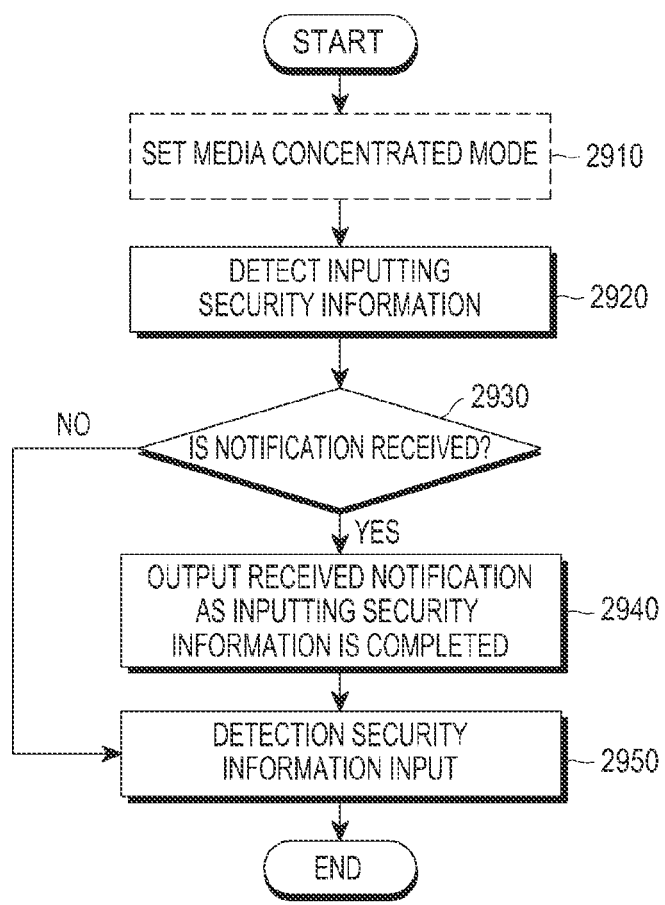
FIG. 29 is a flowchart of an operation for controlling a notification in an electronic device when a banking application is executed, according to an embodiment of the present invention.

FIG. 29 is a flowchart of an operation for controlling a notification in an electronic device when a banking application is executed, according to an embodiment of the present invention.

Referring to FIG. 29, in operation 2910, the electronic device 101 sets a media-concentrated mode. For example, the electronic device 101 sets the media-concentrated mode to be activated.

The media-concentrated mode may be set to be activated when the electronic device 101 determines that a predetermined application is executed, or may be activated by a user. For example, when the media-concentrated mode is activated by the user, operation 2910 may be omitted.

The media-concentrated mode may be included in a menu item of a predetermined application so as to be activated with respect to the corresponding application, or may be set with respect to all applications installed in the electronic device 101.

In operation 2920, the electronic device 101 determines that an application (for example, a banking application) to which security information (or authentication information or encryption information) may be input is executed.

In operation 2930, the electronic device 101 determines whether at least one notification is received. For example, the at least one notification may be at least one interruption that occurs while security information is input through the banking application.

When it is determined that a notification is received, the electronic device 101 outputs the received notification based on whether inputting the security information is completed in operation 2940.

When the security information is currently being input, the electronic device 101 may execute a control to delay outputting the received notification, and to display a previously received notification at a point in time when inputting the security information is completed.

When it is determined that a notification is not received, the electronic device 101 proceeds to operation 2950.

In operation 2950, the electronic device may continuously detect whether security information is being input.

At least one of the operations illustrated in FIG. 29 may be omitted, or at least one other operation may be added between the operations. In addition, the operations may be sequentially processed as illustrated in FIG. 29, and the execution sequence of at least one operation may be switched with that of another operation.

Figure 30:
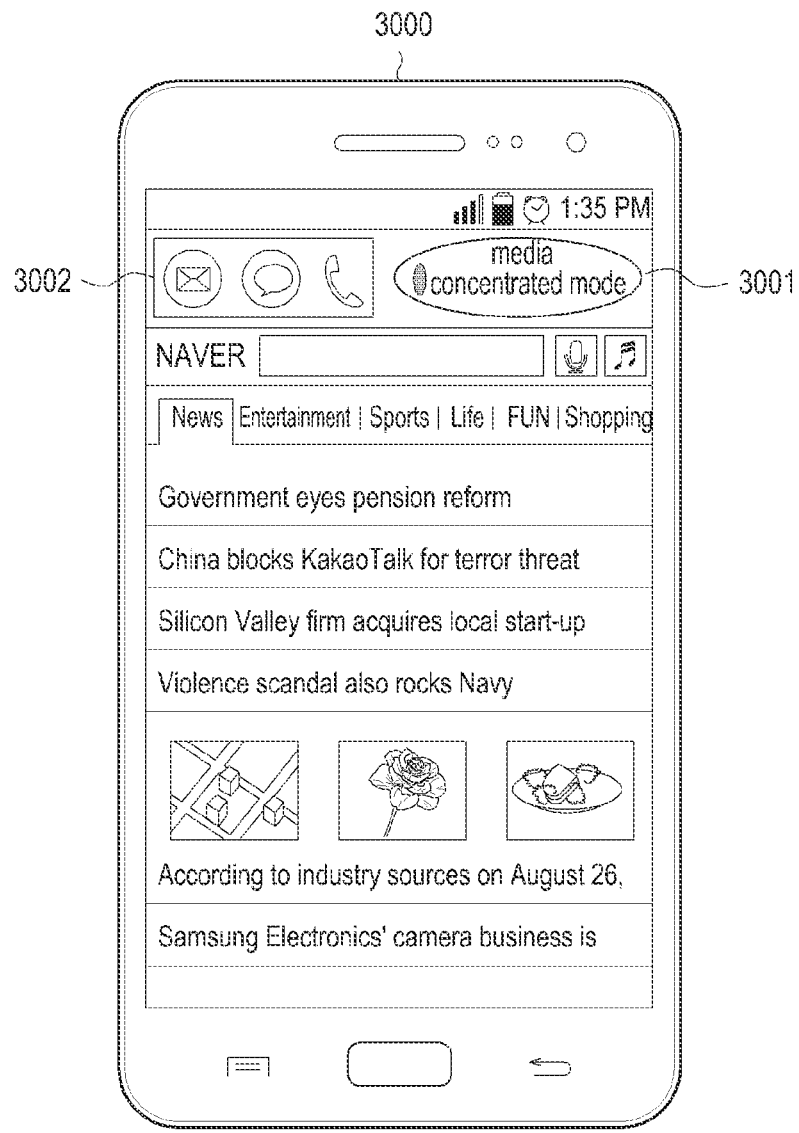
FIG. 30 is a diagram of a web browser screen to which a media-concentrated mode function is applied, according to an embodiment of the present invention.

FIG. 30 is a diagram of a web browser screen to which a media-concentrated mode function is applied, according to an embodiment of the present invention.

Referring to FIG. 30, a web browser screen 3000 includes a media-concentrated button 3001 for executing a media-concentrated mode and notification icons 3002 indicating that at least one interruption occurs.

When the media-concentrated mode button 3002 is selected by a user input, the media-concentrated mode is activated and the electronic device controls a notification associated with at least one interruption that occurs while a user movement is detected in the web browser.

Figure 31:
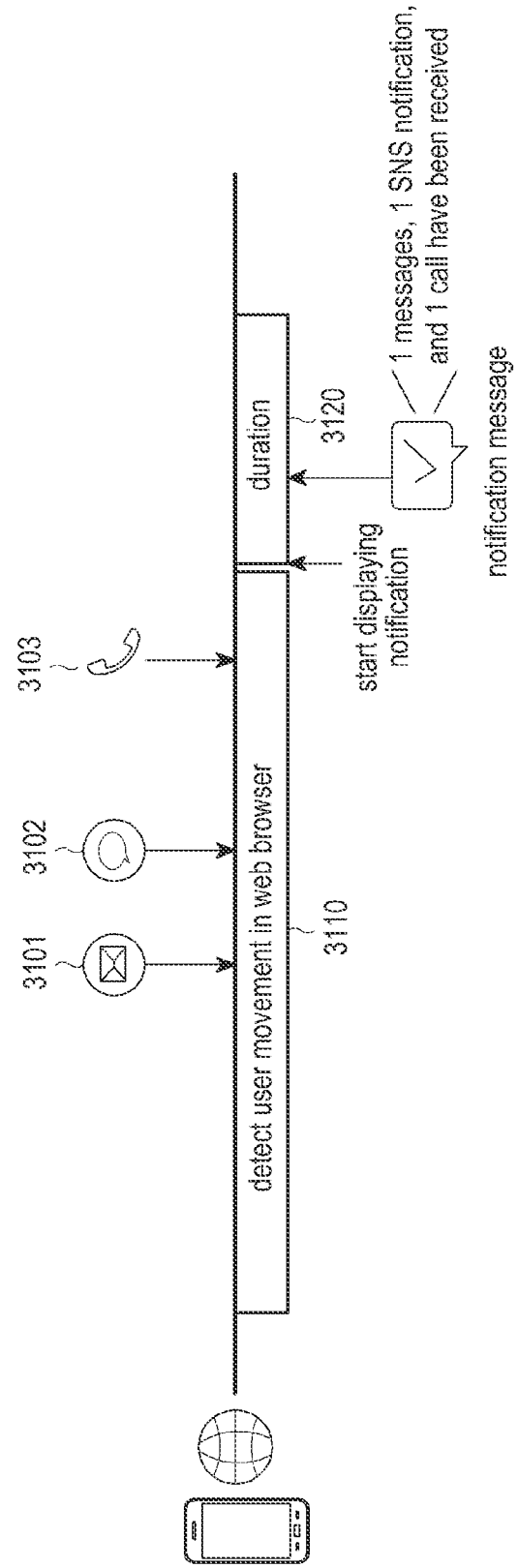
FIG. 31 is a timing diagram indicating a point in time for outputting a notification received while a web browser is executed and a media-concentrated mode is activated, according to an embodiment of the present invention.

FIG. 31 is a timing diagram indicating a point in time for outputting a notification received while a web browser is executed and a media-concentrated mode is activated, according to an embodiment of the present invention.

Referring to FIG. 31, it is assumed that a media-concentrated mode is activated in the electronic device 101 and an operation of detecting a user movement is currently executed through the web browser. For example, during a duration 3110 where a user movement is detected through the web browser, at least one interruption occurs, i.e., a message reception event 3101, an SNS notification reception event 3102, and a call reception event 3103.

When the media-concentrated mode is activated, the electronic device 101 delays a notification associated with at least one interruption that occurs in the duration 3110 where a user movement is detected in the web browser, to be displayed at a point in time when it is determined that a user movement is not detected. For example, the point in time when it is determined that a user movement is not detected may be a point in time when at least one sensor (for example, an iris sensor or a touch sensor) included in the electronic device 101 determines that a user does not view a web browser during a predetermined period of time, or that an input such as a scroll control motion or the like is not detected.

The delayed notification associated with the interruption is displayed in the duration 3120 where the user movement is not detected. The displayed notification is provided in a form of a notification message. For example, as illustrated in FIG. 31, the notification message is a notification associated with the message reception event 3101, the SNS notification reception event 3102, and the call reception event 3103 which occurs when user movement is detected in the web browser. The notification message outputs information indicating that "1 message, 1 SNS notification, and 1 call have been received."

Figure 32:
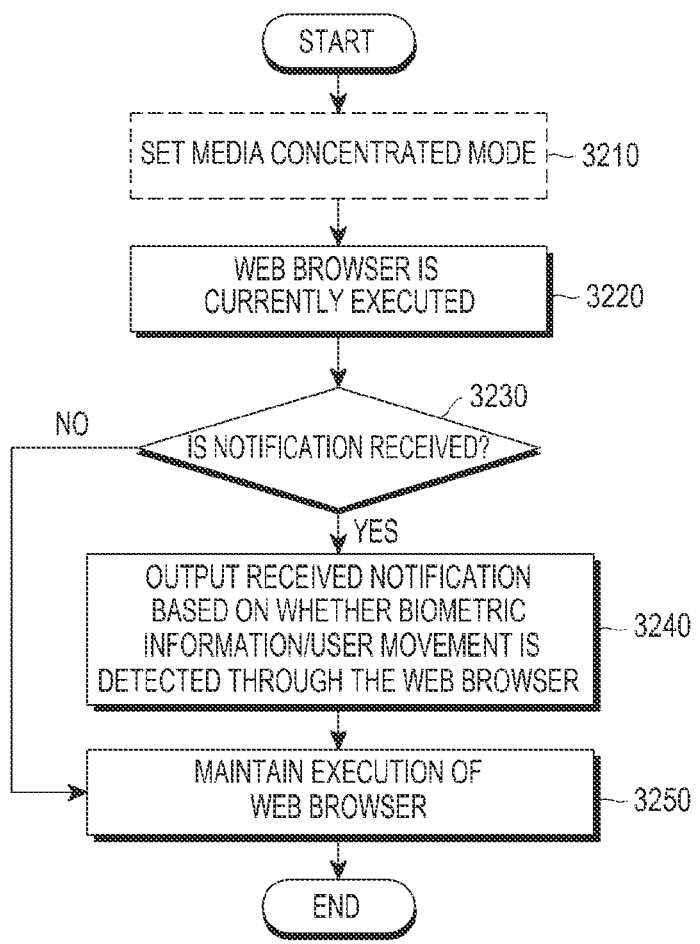
FIG. 32 is a flowchart of an operation for controlling a notification in an electronic device when a web browser is executed, according to an embodiment of the present invention.

FIG. 32 is a flowchart of an operation for controlling a notification in an electronic device when a web browser is executed, according to an embodiment of the present invention.

Referring to FIG. 32, in operation 3210, the electronic device 101 sets a media-concentrated mode. For example, the electronic device 101 sets the media-concentrated mode to be activated.

The media-concentrated mode may be set to be activated when the electronic device 101 determines that a predetermined application is executed, or may be activated by a user. For example, when the media-concentrated mode is activated by the user, operation 3210 may be omitted.

The media-concentrated mode may be included in a menu item of a predetermined application so as to be activated with respect to the corresponding application, or may be set with respect to all applications installed in the electronic device 101.

In operation 3220, the electronic device 101 determines that a web browser is currently executed.

In operation 3230, the electronic device 101 determines whether at least one notification is received. For example, the at least one notification may be at least one interruption that occurs while a user movement or input is detected while the web browser is executed.

When it is determined that a notification is received, the electronic device 101 outputs the received notification based on whether user movement is detected. The electronic device 101 may additionally output the received notification based on whether biometric information is input in a predetermined pattern in the web browser in operation 3240.

When it is determined that a notification is not received, the electronic device 101 proceeds to operation 3250.

In operation 3250, the electronic device 101 maintains execution of the web browser.

At least one of the operations illustrated in FIG. 32 may be omitted, or at least one other operation may be added between the operations. In addition, the operations may be sequentially processed as illustrated in FIG. 32, and the execution sequence of at least one operation may be switched with that of another operation.

Figure 33:
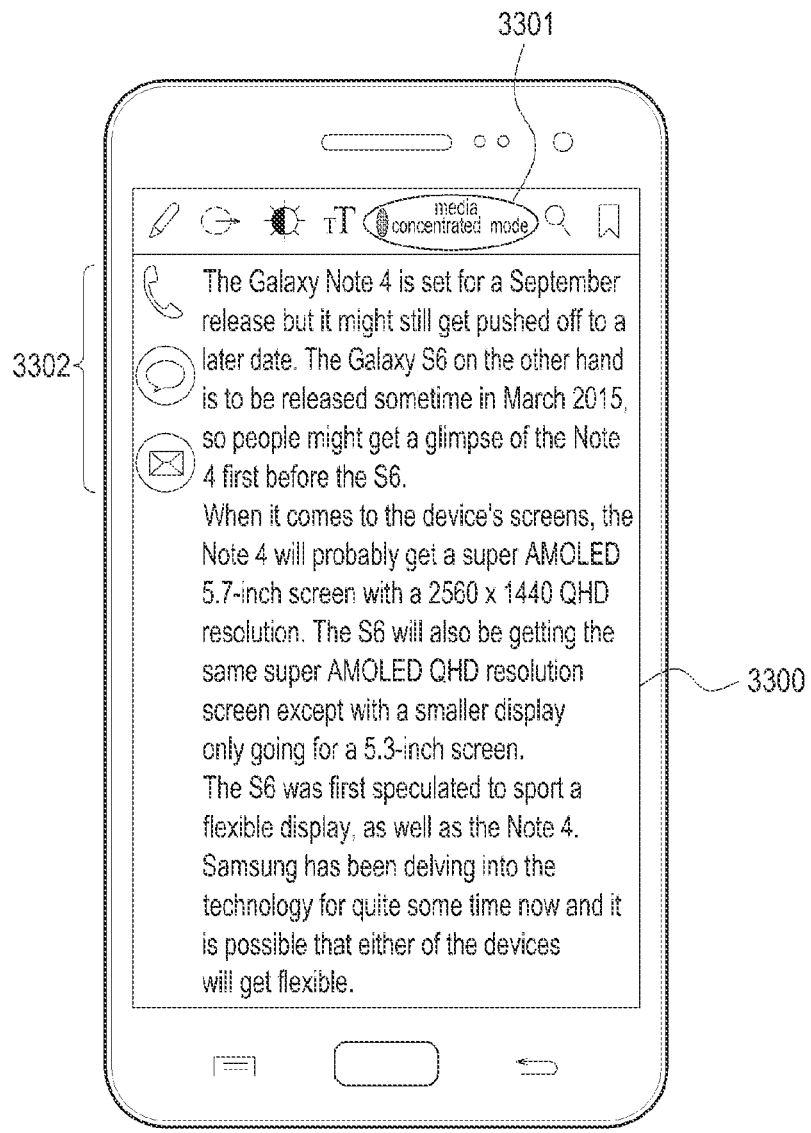
FIG. 33 is a diagram of an electronic book application screen to which a media-concentrated mode function is applied, according to an embodiment of the present invention.

FIG. 33 is a diagram of an electronic book application screen to which a media-concentrated mode function is applied, according to an embodiment of the present invention.

Referring to FIG. 33, an electronic book application screen 3300 includes a media-concentrated button 3301 for executing a media-concentrated mode and notification icons 3302 indicating that at least one interruption occurs.

When a media-concentrated mode button 3301 is selected by a user input, the media-concentrated mode is activated and the electronic device 101 controls a notification associated with at least one interruption based on whether a user movement is detected while the electronic book application is executed.

Figure 34:
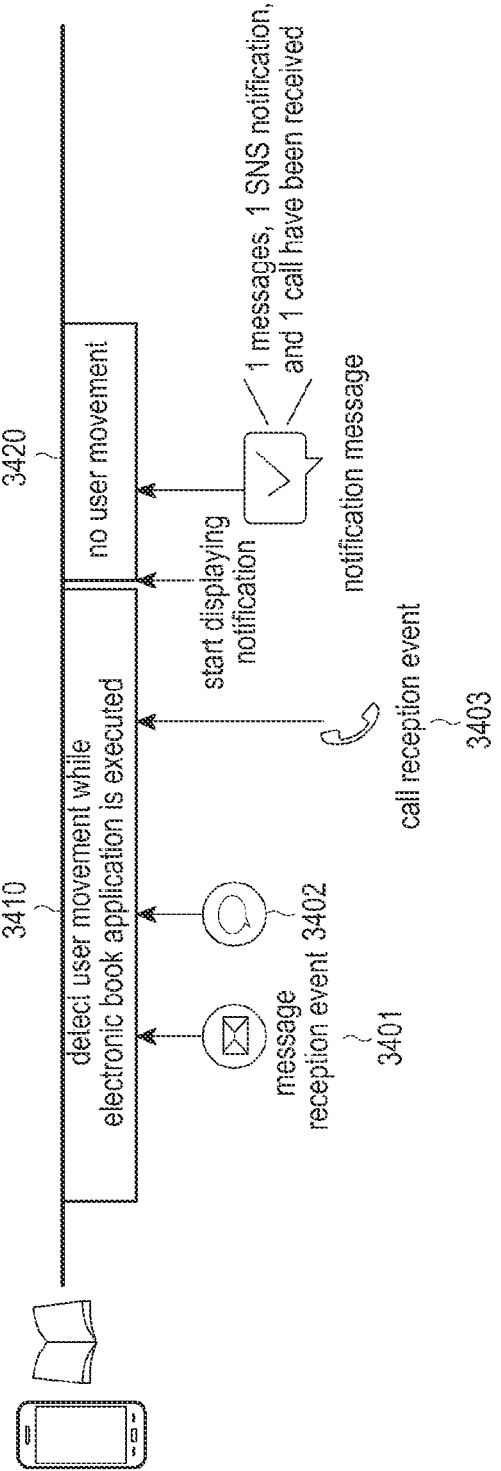
FIG. 34 is a timing diagram indicating a point in time for outputting a notification received while an electronic book application is executed and a media-concentrated mode is activated, according to an embodiment of the present invention.

FIG. 34 is a timing diagram indicating a point in time for outputting a notification received while an electronic book application is executed and a media-concentrated mode is activated, according to an embodiment of the present invention.

Referring to FIG. 34, it is assumed that a media-concentrated mode is activated in the electronic device 101 and that an operation for detecting a user movement is executed in an electronic book application. For example, in duration 3410 where a user movement is detected while the electronic book application is executed, at least one interruption occurs, i.e., a message reception event 3401, an SNS notification reception event 3402, and a call reception event 3403.

When the media-concentrated mode is activated, the electronic device 101 delays a notification associated with the at least one interruption that occurs during the duration 3410 where a user movement is detected, to be displayed in a duration 3420 where a user movement is not detected. For example, duration 3420 where a user movement is not detected may be a duration where at least one sensor (for example, an iris sensor or a touch sensor) included in the electronic device 101 determines that an iris of a user does not move or a user does not operate the electronic book application.

The delayed notification associated with the at least one interruption is displayed in the duration 3420 where the user movement is not detected. The displayed notification is provided in the form of a notification message. For example, as illustrated, in FIG. 34, the notification message is a notification associated with the message reception event 3401, the SNS notification reception event 3402, and the call reception event 3403 which occurs when user movement is detected while the electronic book is executed. The notification message outputs information indicating that "1 message, 1 SNS notification, and 1 call have been received."

Figure 35:
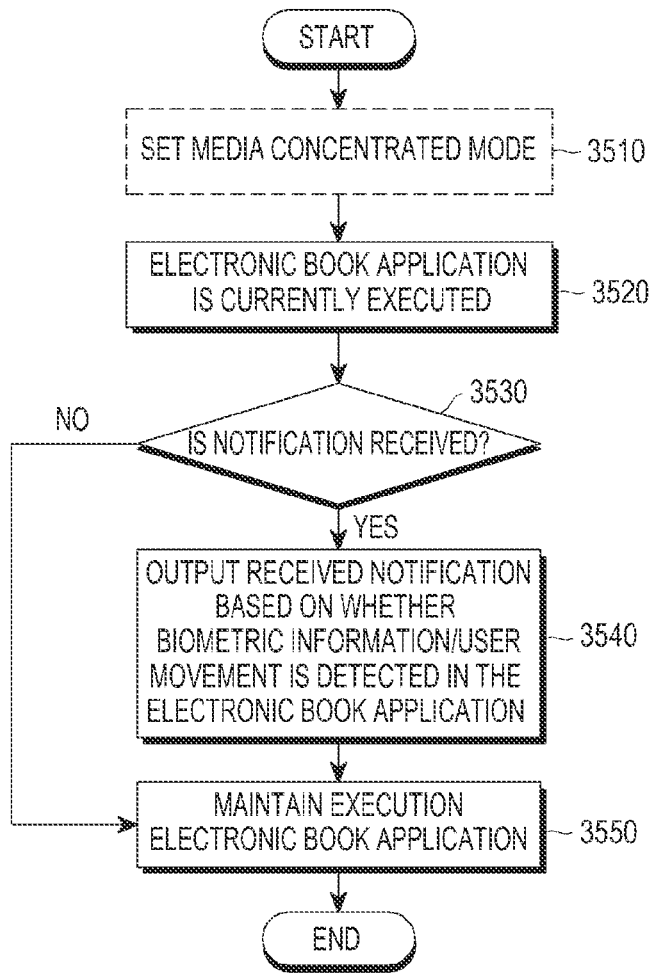
FIG. 35 is a flowchart of an operation for controlling a notification in an electronic device when an electronic book application is executed, according to an embodiment of the present invention.

FIG. 35 is a flowchart of an operation for controlling a notification in an electronic device when an electronic book application is executed, according to an embodiment of the present invention.

Referring to FIG. 35, in operation 3510, the electronic device 101 sets a media-concentrated mode. For example, the electronic device 101 sets the media-concentrated mode to be activated.

The media-concentrated mode may be set to be activated when the electronic device 101 determines that a predetermined application is executed, or may be activated by a user. For example, when the media-concentrated mode is activated by the user, operation 3510 may be omitted.

The media-concentrated mode may be included in a menu item of a predetermined application so as to be activated with respect to the corresponding application, or may be set with respect to all applications installed in the electronic device 101.

In operation 3520, the electronic device 101 determines that an electronic book application is currently executed.

In operation 3530, the electronic device 101 determines whether at least one notification is received. For example, the at least one notification may be at least one interruption that occurs while a user input (for example, sliding a page of an electronic book) or movement is detected. The electronic device 101 may additionally output the received notification based on whether biometric information is input in a predetermined pattern through the electronic book application.

When it is determined that a notification is not received, the electronic device 101 maintains execution of the electronic book application in operation 3550.

When the user input or movement or biometric information is detected, the electronic device 101 may execute a control to delay outputting the received notification and to display a previously received notification in a duration where the user input or the movement or the biometric information is not detected during a predetermined period of time. For example, the user input or the movement or biometric information may include a motion of a user of sliding a page of the electronic book data, a movement of an iris, etc.

At least one of the operations illustrated in FIG. 35 may be omitted, or at least one other operation may be added between the operations. In addition, the operations may be sequentially processed as illustrated in FIG. 35, and the execution sequence of at least one operation may be switched with that of another operation.

Figure 36:
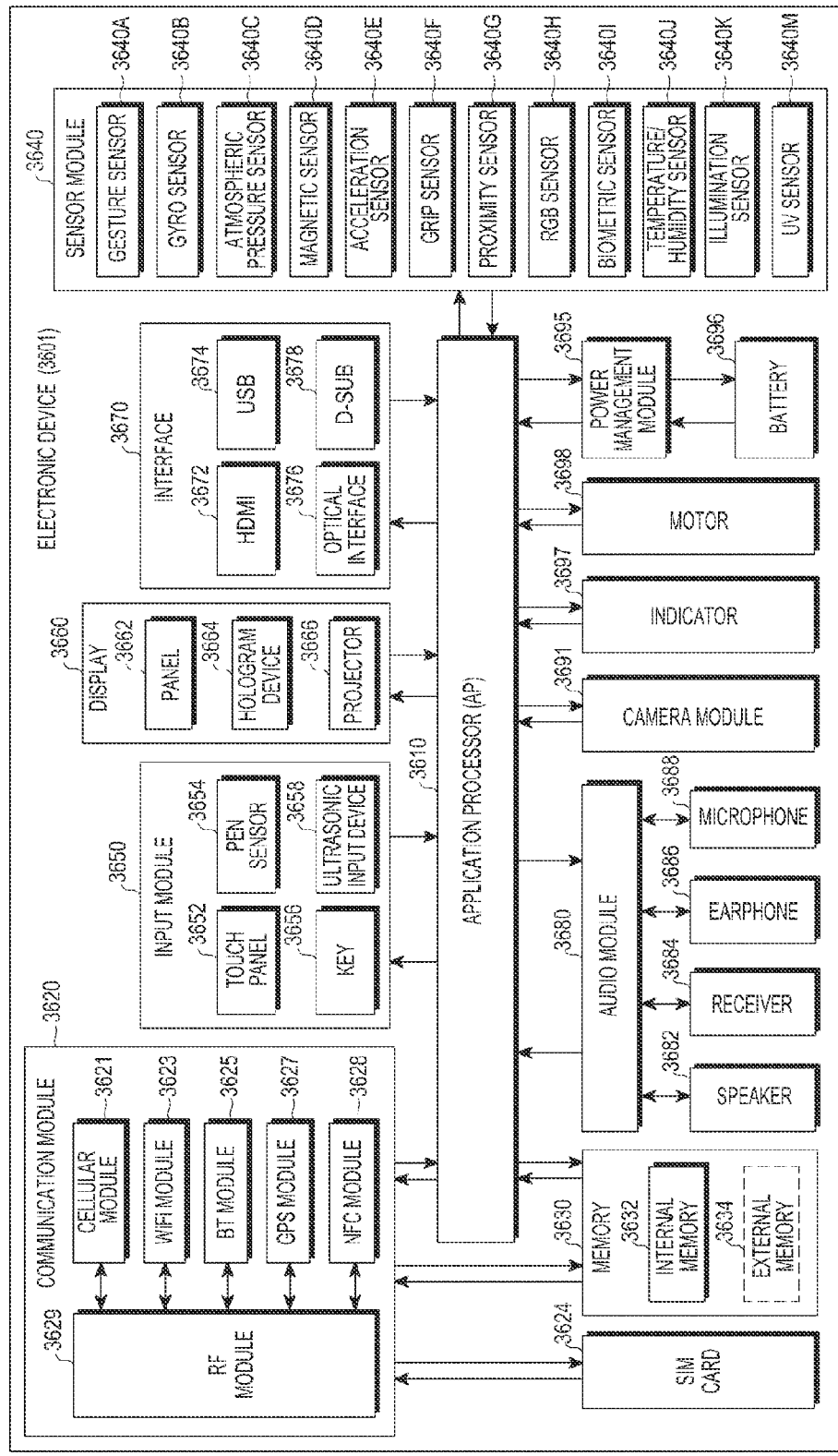
FIG. 36 is a block diagram of a configuration of an electronic device, according to an embodiment of the present invention.

FIG. 36 is a block diagram of a configuration of an electronic device, according to an embodiment of the present invention.

Referring to FIG. 36, electronic device 3601 is provided. Electronic device 3601 may include, for example, all or some of the components of electronic device 101 illustrated in FIG. 1.

The electronic device 3601 includes one or more AP 3610 (for example, the processor 120 or an AP 3610), a communication module 3620, a Subscriber Identification Module (SIM) card 3624, a memory 3630, a sensor module 3640, an input module 3650, a display 3660, an interface 3670, an audio module 3680, a camera module 3691, a power management module 3695 a battery 3696, an indicator 3697, and a motor 3698.

The AP 3610 controls a plurality of hardware or software components connected thereto by driving an operating system or an application program, and performs a variety of data processing and calculations. The AP 3610 may be embodied as a System on Chip (SoC). The AP 3610 may further include a Graphic Processing Unit (GPU) and/or an image signal processor. The AP 3610 may also include at least some (for example, a cellular module 3621) of the components of the notification controlling module 200 illustrated in FIG. 2. The AP 3610 loads instructions or data, received from at least one other component (for example, a non-volatile memory), in a volatile memory to process the loaded instructions or data, and stores various types of data in a non-volatile memory.

The communication module 3620 may have a configuration equal or similar to the communication interface 160 of FIG. 1. The communication module 3620 includes a cellular module 3621, a WiFi module 3623, a Bluetooth (BT) module 3625, a GPS module 3627, a Near-Field Communication (NFC) module 3628, and a Radio Frequency (RF) module 3629.

The cellular module 3621 provides a voice call, video call, text message services, or Internet services through, for example, a communication network. The cellular module 3621 identifies and authenticates the electronic device 3601 within a communication network by using the SIM card 3624. The cellular module 3621 may perform at least some of functions that may be provided by the AP 3610. The cellular module 3621 may include a Communication Processor (CP).

The WiFi module 3623, the BT module 3625, the GPS module 3627, and the NFC module 3628 may include, for example, a processor for processing data transmitted/received through a corresponding module. At least some (for example, two or more) of the cellular module 3621, the WIFI module 3623, the BT module 3625, the GPS module 3627, and the NFC module 3628 may be included in one Integrated Chip (IC) or IC package.

The RF module 3629 transmits/receives a communication signal (for example, an RF signal). The RF module 3629 may include a transceiver, a Power Amp Module (PAM), a frequency filter, a Low Noise Amplifier (LNA), or an antenna. At least one of the cellular module 3621, the WIFI module 3623, the BT module 3625, the GPS module 3627, and the NFC module 3628 may transmit/receive an RF signal through a separate RF module.

The SIM card 3624 is a card that may be inserted into a slot formed in the electronic device 3601. The SIM card 3624 includes unique identification information (for example, an Integrated Circuit Card Identifier (ICCID)) or subscriber information (for example, International Mobile Subscriber Identity (IMI)).

The memory 3630 includes an internal memory 3632 or an external memory 3634.

The internal memory 3632 may include at least one of a volatile memory (for example, a Dynamic Random Access Memory (DRAM), a Static RAM (SRAM), a Synchronous Dynamic RAM (SDRAM), etc.) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), etc.).

The external memory 3634 may include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 3634 may be functionally and/or physically connected to the electronic device 3601 through various interfaces.

The sensor module 3640 measures a physical quantity or detects an operation state of the electronic device 3601, and converts the measured or detected information to an electrical signal. The sensor module 3640 includes, for example, a gesture sensor 3640A, a gyro sensor 3640B, an atmospheric pressure sensor 3640C, a magnetic sensor 3640D, an acceleration sensor 3640E, a grip sensor 3640F, a proximity sensor 3640O, a color sensor 3640H (for example, Red, Green, and Blue (RGB) sensor), a biometric sensor 3640I, a temperature/humidity sensor 3640J, an illumination sensor 3640K, and an Ultra Violet (UV) sensor 3640M. Additionally or alternatively, the sensor module 3640 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 3640 may further include a control circuit for controlling at least one sensor included therein. The electronic device 3601 may further include a processor that is configured, as a part of the AP 3610 or a separate component from the AP 3610, to control the sensor module 3640, thereby controlling the sensor module 3640 while the AP 3610 is in a sleep mode.

The input module 3650 includes a touch panel 3652, a (digital) pen sensor 3654, a key 3656, or an ultrasonic input device 3658.

The touch panel 3652 may use at least one of, for example, a capacitive type, a resistive type, an infrared type, and an ultrasonic type. The touch panel 3652 may further include a control circuit. The touch panel 3652 may further include a tactile layer, and provide a tactile reaction to a user.

The (digital) pen sensor 3654 may include a recognition sheet which is a part of the touch panel or a separate recognition sheet.

The key 3656 may include a physical button, an optical key or a keypad.

The ultrasonic input unit 3658 inputs data through an input means that generates an ultrasonic signal, and the electronic device 3601 identifies data by detecting a sound wave with a microphone 3688.

The display 3660 includes a panel 3662, a hologram device 3664, and a projector 3666.

The panel 3662 may include a configuration that is identical or similar to the display 160 illustrated in FIG. 1. The panel 3662 may be embodied to be, for example, flexible, transparent, or wearable. The panel 3662 may also be configured to be integrated with the touch panel 3652 as a single module.

The hologram device 3664 displays a stereoscopic image in the air by using interference of light.

The projector 3666 projects light onto a screen to display an image. For example, the screen may be located inside or outside the electronic device 3601.

The display 3660 may further include a control circuit for controlling the panel 3662, the hologram device 3664, or the projector 3666.

The interface 3670 includes a High-Definition Multimedia Interface (HDMI) 3672, a Universal Serial Bus (USB) 3674, an optical interface 3676, or a D-subminiature (D-sub) 3678.

The interface 3670 may be included in the communication interface 160 illustrated in FIG. 1. Additionally or alternatively, the interface 3670 may include, for example, a Mobile High-definition Link (MHL) interface, a Secure Digital (SD) card/Multi-Media Card (MMC) interface, or an Infrared Data Association (IrDA) standard interface.

The audio module 3680 bilaterally converts a sound and an electrical signal. At least some components of the audio module 3680 may be included in the input/output interface 140 illustrated in FIG. 1. The audio module 3680 processes sound information input or output through a speaker 3682, a receiver 3684, earphones 3686, and the microphone 3688.

The camera module 3691 captures a still image or a video image, and may include one or more image sensors (for example, a front sensor or a back sensor), a lens, an Image Signal Processor (ISP), or a flash (for example, an LED or a xenon lamp).

The power management module 3695 manages power of the electronic device 3601. The power management module 3695 may include a Power Management Integrated Circuit (PMIC), a charger Integrated Circuit (IC), or a battery gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop, a resonance circuit, a rectifier, etc. may be added.

The battery gauge measures a residual quantity of the battery 3696, a charging voltage and current, or temperature. The battery 3696 may include, for example, a rechargeable battery and/or a solar battery.

The indicator 3697 indicates particular status of the electronic device 3601 or a part thereof (for example, the AP 3610), for example, a booting status, a message status, a charging status, etc.

The motor 3698 converts an electrical signal into mechanical vibrations, and generates a vibration or haptic effect.

Although not illustrated, the electronic device 3601 may include a processing device (for example, a GPU) for supporting mobile TV. The processing device for supporting mobile TV may process media data according to a standard of Digital Multimedia Broadcasting (DMB), Digital Video Broadcasting (DVB), media flow or the like.

Each of the components of the electronic device according to the present invention may be implemented by one or more components and the name of the corresponding component may vary depending on a type of the electronic device. The electronic device according to various embodiments of the present invention may include at least one of the above described elements and may exclude some of the elements or further include other additional elements. Further, some of the elements of the electronic device according to various embodiments of the present invention may be coupled to form a single entity while performing the same functions as those of the corresponding elements before the coupling.

Figure 37:
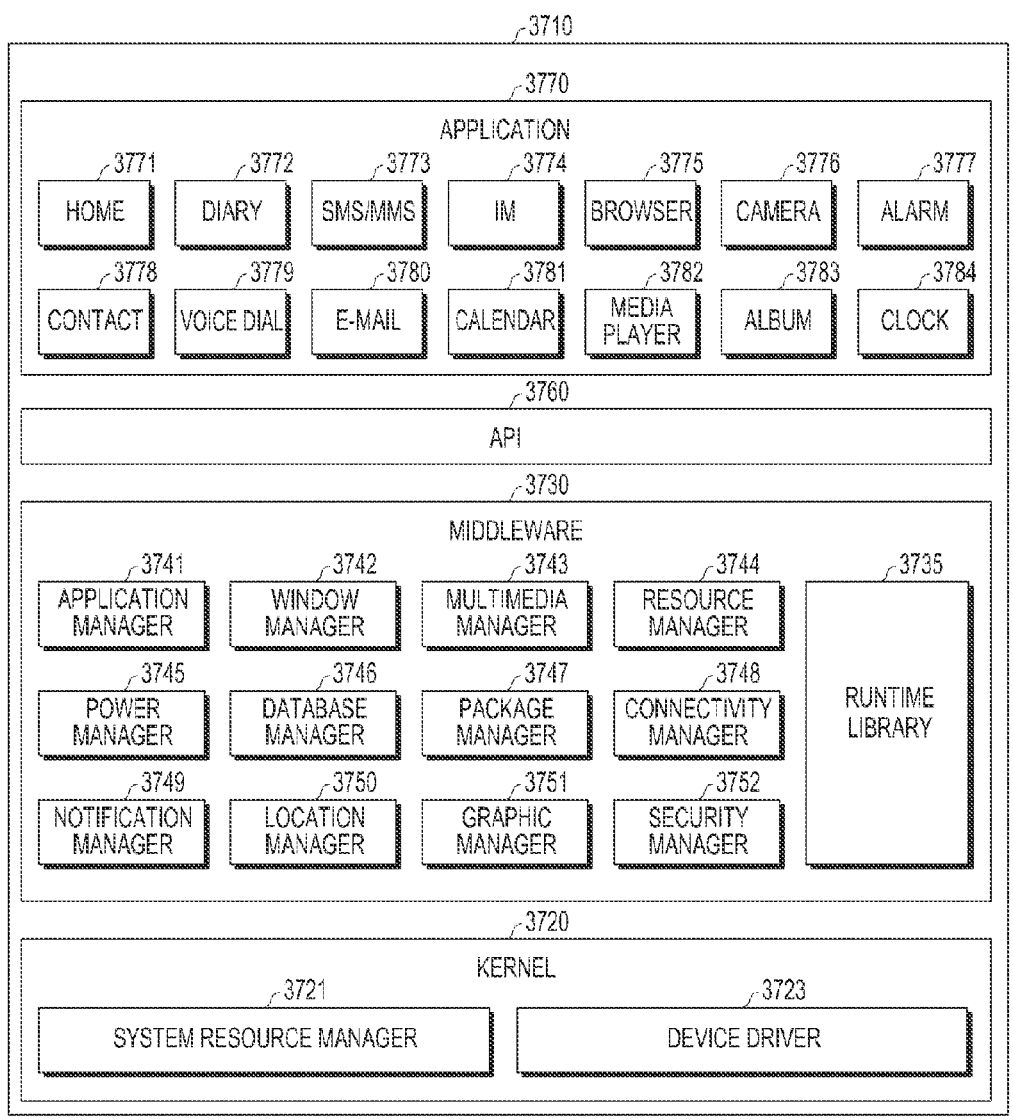
FIG. 37 is a block diagram of a configuration of a program module of an electronic device, according to an embodiment of the present invention.

FIG. 37 is a block diagram of a configuration of a program module of an electronic device, according to an embodiment of the present invention.

Referring to FIG. 37 program module 3710 (for example, the program 140) is provided. The program module 3710 may include an Operating System (OS) for controlling resources related to an electronic device (for example, the electronic device 101) and/or various applications (for example, the application program 147) executed in the operating system. The operating system may be, for example, Android, iOS, Windows, Symbian, Tizen, Bada, or the like.

The programming module 3710 includes a kernel 3720, a middleware 3730, an Application Programming Interface (API) 3760, and/or application 3770 At least some of the program module 3710 may be preloaded in the electronic device 3610 or downloaded in a server (for example, the server 106).

The kernel 3720 (for example, the kernel 141 of FIG. 1) includes a system resource manager 3721 and a device driver 3723.

The system resource manager 3721 controls, allocates, or collects the system resources. The system resource manager 3721 may include a process management unit, a memory management unit, or a file system management unit.

The device driver 3723 may include, for example, a display driver, a camera driver, a Bluetooth driver, a sharedmemory driver, a USB driver, a keypad driver, a WIFI driver, an audio driver, or an Inter-Process Communication (IPC) driver.

The middleware 3730 provides a function commonly required by the application 3770 or provides various functions to the application 3770 through the API 3760 so that the application 3770 may efficiently use limited system resources of the electronic device. The middleware 3730 (for example, the middleware 143) includes at least one of a run time library 3735, an application manager 3741, a window manager 3742, a multimedia manager 3743, a resource manager 3744, a power manager 3745, a database manager 3746, a package manager 3747, a connectivity manager 3748, a notification manager 3749, a location manager 3750, a graphic manager 3751, and a security manager 3752.

The run time library 3735 may include a library module that a compiler uses in order to add new functions through a programming language while the application 3770 is executed. The run time library 3735 performs input/output management, memory management, or an arithmetic function.

The application manager 3741 manages a life cycle of at least one application among the application 3770.

The window manager 3742 manages a GUI resource used in a screen.

The multimedia manager 3743 detects a format required for reproducing various media files and encodes or decodes a media file using a codec appropriate for the corresponding format.

The resource manager 3744 manages resources such as a source code, a memory, or a storage space of at least one application among the application 3770.

The power manager 3745 operates together with a Basic Input/Output System (BIOS), so as to manage a battery or power and may provide power information required for the operation of the electronic device 3601.

The database manager 3746 generates, searches for, or changes a database to be used by at least one of the application 3770.

The package manager 3747 manages the installation or updating of applications distributed in the form of a package file.

The connectivity manager 3748 manages wireless connections, such as WIFI or Bluetooth.

The notification manager 3749 displays or notifies an event such as a received message, an appointment, a proximity notification, etc, to a user without disturbance.

The location manager 3750 manages location information of the electronic device 3601.

The graphic manager 3751 manages graphic effects to be provided to a user and user interfaces related to the graphic effects.

The security manager 3752 provides various security functions required for system security or user authentication.

When the electronic device 3601 has a telephone call function, the middleware 3730 may further include a telephony manager for managing a voice or video call function of the electronic device.

The middleware 3730 may include a middleware module for forming a combination of various functions of the aforementioned components. The middleware 3730 may provide a module specialized for each type of operating system in order to provide a differentiated function. In addition, a few existing components may be dynamically removed from the middleware 3730, or new components may be added to the middleware 3730.

The API 3760 (for example, the API 145), which is a set of API programming functions, may be provided in a different configuration for each operating system. For example, in the case of Android or iOS, one API set may be provided for each platform, and in the case of Tizen, two or more API sets may be provided for each platform.

The application 3770 (for example, the applications 147) may include one or more of a home application 3771, a diary application 3772, an SMS/MMS application 3773, an Instant Message (IM) application 3774, a browser application 3775, a camera application 3776, an alarm application 3777, a contact information application 3778, a voice dial application 3779, and e-mail application 3780, a calendar application 3781, a media player application 3782, an album application 3783, a clock application 3784, a health care application (for example, an application for measuring an amount of exercise or blood sugar level), and an environmental information application (for example, an application for providing atmospheric pressure, humidity, or temperature information).

The application 3770 may include an application (hereinafter, "information exchange application") supporting exchanging information between the electronic device 3601 and an external electronic device (for example, the first external electronic devices 102 and the second external electronic device 104). The information exchange application may include, for example, a notification relay application for transmitting predetermined information to the external electronic device, or a device management application for managing the external electronic device.

The notification relay application includes a function of transferring, the first external electronic device 102 or the second external electronic device 104, notification information generated from other applications of the electronic device 3601 (for example, an SMS/MMS application, an email application, a health management application, an environmental information application, or the like). Further, the notification relay application receives notification information from the first external electronic device 102 or the second external electronic device 104 and provides the received notification information to a user.

The device management application manages (for example, installs, deletes, or updates) at least one function of the first external electronic device 102 or the second external electronic device 104 communicating with the electronic device 3601 (for example, a function of turning on/off the external electronic device itself (or some components) or a function of adjusting luminance (or a resolution) of the display), applications operating in the external electronic device, or services provided by the external electronic device (for example, a call service and a message service).

The application 3770 may include an application (for example, a health management application) designated according to attributes (for example, attributes of the electronic device such as the type of electronic device which corresponds to a mobile medical device) of the first external electronic device 102 or the second external electronic device 104.

The application 3770 may include an application received from the server 106, the first external electronic device 102, or the second external electronic device 104.

The application 3770 may include a preloaded application or a third party application that may be downloaded from the server 106. The names of the components of the program module 3710 in the present disclosure may be changed according to the type of operating system.

At least some of the programming module 3710 may be embodied as software, firmware, hardware, or a combination of at least two of them. At least some of the programming module 3710 may be implemented (for example, executed) by the processor (for example, the AP 3610) At least some of the programming module 3710 may include a module, program, routine, sets of instructions, process, or the like for performing one or more functions.

The term "module" as used herein may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module", according to the present invention, may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CDROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations of the present invention, and vice versa.

Any of the modules or programming modules according to various embodiments of the present invention may include at least one of the above described elements, exclude some of the elements, or further include other additional elements. The operations performed by the modules, programming module, or other elements according to various embodiments of the present invention may be executed in a sequential, parallel, repetitive, or heuristic manner. Further, some operations may be executed according to another order or may be omitted, or other operations may be added.

According to various embodiments of the present invention, a storage medium stores instructions and the instructions are set to enable at least one processor to execute at least one operation when the instructions are executed by the at least one processor. The at least one operation includes determining an execution state of an application that is currently executed when at least one interruption occurs while the application is executed, and controlling whether to output a notification associated with the interruption based on the execution state of the application.

Various embodiments disclosed herein are provided merely to easily describe technical details of the present invention and to help the understanding of the present invention, and are not intended to limit the scope of the present invention. Therefore, it should be construed that all modifications and changes or modified and changed forms based on the technical idea of the present invention fall within the scope of the present invention as defined by the appended claims and their equivalents.

What is claimed is:

1. An electronic device, comprising:
a display; and
a processor configured to:
control content to be executed by executing an application,
control an operation to be executed according to an external input by executing the application,
control the display to display a button for setting a media-concentrated mode,
set the electronic device to be operated in the media-concentrated mode when the button is selected by a user,
determine that an interruption of at least one application occurs while the application is executed,
while the electronic device is operated in the media-concentrated mode, determine when to output a notification associated with the interruption, based on whether the external input is received in a predetermined, and
control the display to display the notification associated with the interruption after exceeding the predetermined time, according to the determination of when to output the notification associated with the interruption,
wherein the external input comprises an input related to at least one of a text, security information, health information of a user, and movement information of the user.

2. The electronic device of claim 1, wherein the processor is configured to delay the notification associated with the interruption based on an execution state of the application, determine a point in time for outputting the delayed notification, and control the display to display the notification associated with the interruption that occurs before the determined point in time.

3. The electronic device of claim 2, wherein the application is at least one of a media playback application, a recording application, a document editing application, an electronic book application, a healthcare application, a banking application, a web browser, and a game application.

4. The electronic device of claim 3, wherein the execution state of the application includes at least one of a media content playback state, a user movement measurement state, a user movement detection state, a game content execution state, a content display state, a content input state, and a content recording state.

5. The electronic device of claim 4, wherein, when the interruption occurs while the media playback application is executed, the processor is configured to determine a point in time when a sound level of media that is currently played back is output to be lower than a predetermined reference sound level, as the point in time for notification,
wherein the predetermined reference sound level is any one of sound levels at which the media is played back.

6. The electronic device of claim 4, wherein, when the interruption occurs while the healthcare application is executed, the processor is configured to determine a period when a user movement is not detected, as the point in time for notification.

7. The electronic device of claim 4, wherein, when the interruption occurs while the game application is executed, the processor is configured to determine a period when a user gesture input is not detected, as the point in time for notification.

8. The electronic device of claim 4, wherein, when the interruption occurs while recording is executed through the recording application, the processor is configured to determine a point in time when the recording is completed, as the point in time for notification.

9. The electronic device of claim 4, wherein, when the interruption occurs while the document editing application is executed, the processor is configured to determine a period when a text input is not detected, as the point in time for notification.

10. The electronic device of claim 4, wherein, when the interruption occurs while at least one of the electronic book application and the web browser is executed, the processor is configured to determine a point in time when biometric information of a user is not input in a predetermined pattern, as the point in time for notification.

11. The electronic device of claim 4, wherein, when the interruption occurs while authentication information is input through the banking application, the processor is configured to determine a point in time after the authentication information is completely input, as the point in time for notification.

12. The electronic device of claim 1, wherein the interruption includes at least one of a call reception notification, a missed call notification, a message reception notification, and a social network service (SNS) notification.

13. A method of controlling a notification in an electronic device, the method comprising:
    executing content by executing an application;
    executing an operation according to an external input by executing the application;
    displaying a button for setting a media-concentrated mode;
    setting the electronic device to be operated in the media-concentrated mode when the button is selected by a user;
    determining an interruption of at least one application occurs while the application is executed;
    while the electronic device is operated in the media-concentrated mode, determining when to output a notification associated with the interruption, based on whether the external input is received in a predetermined time; and
    displaying the notification associated with the interruption after exceeding the predetermined time, according to the determination of when to output the notification associated with the interruption,
    wherein the external input comprises an input related to at least one of a text, security information, health information of a user, and movement information of the user.

14. The method of claim 13, wherein the application is one of a media playback application, a recording application, a document editing application, an electronic book application, a healthcare application, a banking application, a web browser, and a game application.

15. The method of claim 14, wherein the execution state of the application includes at least one of a media content playback state, a user movement measurement state, a user movement detection state, a game content execution state, a content display state, a content input state, and a content recording state.

16. The method of claim 15, further comprising:
    when the interruption occurs while the media playback application is executed, determining a point in time when a sound level of media that is currently played back is output to be lower than a predetermined reference sound level, as the point in time for notification,
    wherein the predetermined reference sound level is any one of sound levels at which the media is played back.

17. The method of claim 15, further comprising:
    when the interruption occurs while the health care application is executed, determining a period when a user movement is not detected, as the point in time for notification.

18. The method of claim 15, further comprising:
    when the interruption occurs while the game application is executed, determining a period when a user gesture input is not detected, as the point in time for notification.

19. The method of claim 15, further comprising:
    when the interruption occurs while recording is executed through the recording application, determining a point in time when the recording is completed, as the point in time for notification.

20. The method of claim 15, further comprising:
    when the interruption occurs while the document editing application is executed, determining a period when a text input is not detected, as the point in time for notification.

21. The method of claim 15, further comprising:
    when the interruption occurs while at least one of the electronic book application and the web browser is executed, determining a point in time when biometric information of a user is not input in a predetermined pattern, as the point in time for notification.

22. The method of claim 15, further comprising:
    when the interruption occurs while authentication information is input through the banking application, determining a point in time after the authentication information is completely input, as the point in time for notification.

23. The method of claim 13, wherein the interruption includes at least one of a call reception notification, a missed call notification, a message reception notification, and a social network service (SNS) notification.

* * * * *